(12) United States Patent
Arbuckle et al.

(10) Patent No.: US 8,417,399 B2
(45) Date of Patent: Apr. 9, 2013

(54) SYSTEMS AND METHODS FOR ORIENTING A MARINE VESSEL TO MINIMIZE PITCH OR ROLL

(75) Inventors: Jason S. Arbuckle, Horicon, WI (US); William R. Robertson, Oshkosh, WI (US); Kenneth G. Gable, Oshkosh, WI (US)

(73) Assignee: Brunswick Corporation, Lake Forest, IL (US)

(*) Notice: Subject to any disclaimer, the term of this patent is extended or adjusted under 35 U.S.C. 154(b) by 413 days.

(21) Appl. No.: 12/881,840

(22) Filed: Sep. 14, 2010

(65) Prior Publication Data

US 2011/0153125 A1 Jun. 23, 2011

Related U.S. Application Data

(60) Provisional application No. 61/289,582, filed on Dec. 23, 2009.

(51) Int. Cl.
*G06F 7/00* (2006.01)
*G01C 21/00* (2006.01)

(52) U.S. Cl. .................. 701/21; 701/1; 701/466

(58) Field of Classification Search ............ 701/21, 701/466; 114/122, 126, 144 A, 144 R, 144 RE, 114/253, 264, 61.14; 181/113, 114; 318/588; 343/757
See application file for complete search history.

(56) References Cited

U.S. PATENT DOCUMENTS

| | | | |
|---|---|---|---|
| 4,009,678 A | | 3/1977 | North |
| 4,220,111 A | | 9/1980 | Krautkremer et al. |
| 4,691,659 A | | 9/1987 | Ito et al. |
| 4,769,773 A | * | 9/1988 | Shatto, Jr. ............ 701/21 |
| 5,031,561 A | | 7/1991 | Nilsson |
| 5,090,929 A | | 2/1992 | Rieben |
| 5,108,325 A | | 4/1992 | Livingston et al. |
| 5,386,368 A | * | 1/1995 | Knight ............ 701/116 |
| 5,491,636 A | * | 2/1996 | Robertson et al. ............ 701/116 |

(Continued)

FOREIGN PATENT DOCUMENTS

| DE | 906 907 C | 3/1954 |
|---|---|---|
| EP | 0 423 901 A1 | 4/1991 |

(Continued)

OTHER PUBLICATIONS

Strand, Jann Peter et al, Position Control Systems for Offshore Vessels; The Ocean Engineering Handbook, 2001.

(Continued)

*Primary Examiner* — Ian Jen
(74) *Attorney, Agent, or Firm* — Andrus, Sceales, Starke & Sawall, LLP

(57) ABSTRACT

Systems and methods for orienting a marine vessel minimize at least one of pitch and roll in a station keeping mode. A control device having a memory and a programmable circuit is programmed to control operation of the plurality of marine propulsion devices to maintain orientation of a marine vessel in a selected global position and heading. The control device receives at least one of actual pitch and actual roll of the marine vessel in the global position and controls operation of the plurality of marine propulsion units to change the heading of the marine vessel to minimize at least one of the actual pitch and the actual roll while maintaining the marine vessel in the selected global position.

21 Claims, 17 Drawing Sheets

U.S. PATENT DOCUMENTS

| | | | |
|---|---|---|---|
| 5,735,718 A | 4/1998 | Ekwall | |
| 5,755,605 A | 5/1998 | Asberg | |
| 6,142,841 A | 11/2000 | Alexander, Jr. et al. | |
| 6,230,642 B1 | 5/2001 | McKenney et al. | |
| 6,234,853 B1 | 5/2001 | Lanyi et al. | |
| 6,357,375 B1 | 3/2002 | Ellis | |
| 6,386,930 B2 | 5/2002 | Moffet | |
| 6,431,928 B1 | 8/2002 | Aarnivuo | |
| 6,447,349 B1 | 9/2002 | Fadeley et al. | |
| 6,511,354 B1 | 1/2003 | Gonring et al. | |
| 6,623,320 B1 | 9/2003 | Hedlund | |
| 6,705,907 B1 | 3/2004 | Hedlund | |
| 6,712,654 B1 | 3/2004 | Putaansuu | |
| 7,305,928 B2 | 12/2007 | Bradley et al. | |
| 2012/0245839 A1* | 9/2012 | Syed et al. | 701/408 |

FOREIGN PATENT DOCUMENTS

| | | |
|---|---|---|
| JP | 58-61097 A | 4/1983 |
| JP | 7-223591 A | 8/1995 |
| JP | 2009-227035 A | 10/2009 |
| JP | 2009-241738 A | 10/2009 |
| WO | 2006/058400 A1 | 6/2006 |

OTHER PUBLICATIONS

European Search Report for corresponding application EP 10252163.0, having a completion date of Oct. 25, 2012.

* cited by examiner

SYSTEMS AND METHODS FOR ORIENTING A MARINE VESSEL TO MINIMIZE PITCH OR ROLL

CROSS-REFERENCE TO RELATED APPLICATION

The present application claims priority to copending U.S. Provisional Patent Application No. 61/289,582, which is incorporated herein in entirety by reference.

FIELD

The present disclosure relates generally to systems and methods for orienting a marine vessel.

BACKGROUND

Bradley et al U.S. Pat. No. 7,305,928 discloses vessel positioning systems that maneuver a marine vessel in such a way that the vessel maintains its global position and heading in accordance with a desired position and heading selected by the operator of the marine vessel. When used in conjunction with a joystick, the operator of the marine vessel can place the system in a station keeping-enabled mode and the system then maintains the desired position obtained upon the initial change in the joystick from an active mode to an inactive mode. In this way, the operator can selectively maneuver the marine vessel manually and, when the joystick is released, the vessel will maintain the position in which it was at the instant the operator stopped maneuvering it with the joystick.

SUMMARY

The present inventors have recognized that the station keeping functions provided in the prior art can often place the marine vessel in a position where it is both pitching and rolling over waves. Combined pitching and rolling action can cause passenger discomfort, which is undesirable. That is, it has been found that many passengers will be more comfortable if the vessel is maintained in a position where it is pitching but not rolling or rolling but not pitching.

The present disclosure provides systems and methods for orienting a vessel to minimize or eliminate pitch or roll when a marine vessel is maintained by station keeping systems. In one example, a system for orienting a marine vessel comprises a plurality of marine propulsion devices for orienting a marine vessel; and a control device having a memory and a programmable circuit. The control device is programmed to control operation of the plurality of marine propulsion devices to maintain orientation of a marine vessel in a selected global position. In addition, the control device receives at least one of actual pitch and actual roll of the marine vessel in the global position and is programmed to control operation of the plurality of marine propulsion units to change the heading of the marine vessel to minimize at least one of the actual pitch and the actual roll while maintaining the marine vessel in the selected global position.

In another example, a method for orienting a marine vessel comprises (1) operating a control system for maintaining a global position and heading of the marine vessel; (2) determining at least one of pitch and roll of the marine vessel in the global position; and (3) operating the control system to change the heading of the marine vessel to minimize at least one of the pitch and the roll while maintaining the marine vessel in the global position.

In another example, a system for orienting a marine vessel comprises a plurality of marine propulsion devices for orienting a marine vessel; control means for controlling operation of the plurality of marine propulsion devices to maintain orientation of a marine vessel in a selected global position; control means for receiving at least one of existing pitch and existing roll of the marine vessel in the global position; and control means for controlling operation of the plurality of marine propulsion units to change the actual heading of the marine vessel to minimize at least one of actual pitch and actual roll of the marine vessel while maintaining the marine vessel in the selected global position.

DETAILED DESCRIPTION OF THE DRAWINGS

Figure 2:
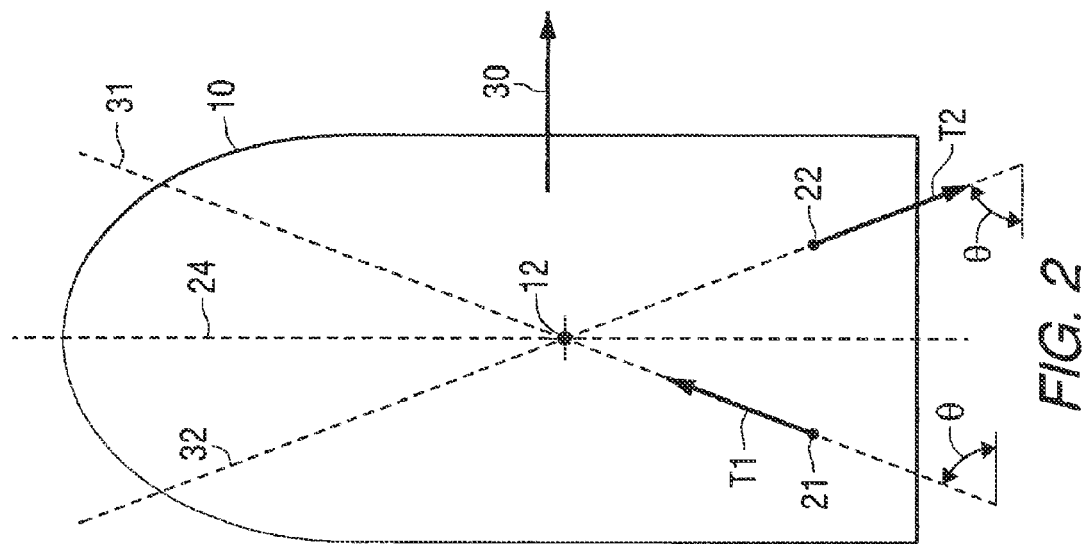
FIGS. 2 and 3 illustrate the arrangement of thrust vectors during a sidle movement of the marine vessel.

In the present description, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. §112, sixth paragraph only if the terms "means for" or "step for" are explicitly recited in the respective limitation.

Throughout the description of the preferred embodiments, like components will often be identified by like reference numerals.

Drawing FIGS. 1-16 schematically depict various embodiments of marine vessels and control systems for orienting and maneuvering the marine vessels. It should be understood that the particular configurations of the marine vessels and control systems are exemplary. It is possible to apply the concepts described in the present disclosure with substantially different configurations for marine vessels and control systems therefor. For example, the marine vessels that are depicted in the drawing figures have first and second marine propulsion devices 27, 28 that have limited ranges or rotation. However, it should be understood that the concepts disclosed in the present disclosure are applicable to marine vessels having any number of marine propulsion devices and any configuration of a propulsion device, such as propeller, impeller, pod drive, and the like. In addition, the control systems described herein include certain operational structures such as global positioning systems (GPS) devices and an inertial measurement unit (IMU). However, it should be understood that the concepts disclosed in the present disclosure are capable of being implemented with different types of systems for acquiring global position data and are not limited to the specific types and numbers of devices described and depicted herein. Further, the present disclosure describes certain types of user input devices such a joystick 52 and user input 120. However, it should also be recognized that the concepts disclosed in the present disclosure are able to function in a preprogrammed format without user input, or in conjunction with different types of user input devices, as would be known to one of skill in the art. Further equivalents, alternatives and modifications are also possible as would be recognized by those skilled in the art.

Figure 1:
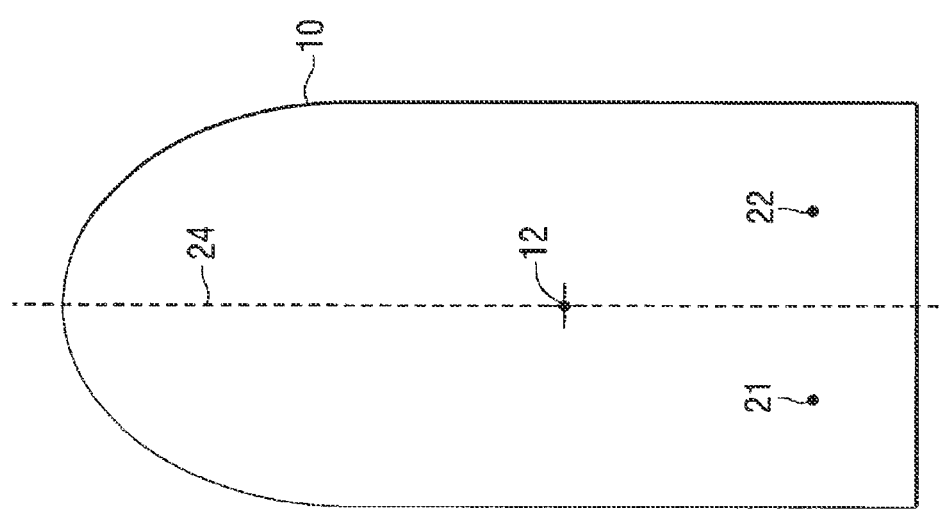
FIG. 1 is a highly schematic representation of a marine vessel showing the steering axes and center of gravity.

In FIG. 1, a marine vessel 10 is illustrated schematically with its center of gravity 12. First and second steering axes, 21 and 22, are illustrated to represent the location of first and second marine propulsion devices (reference numerals 27 and 28 in FIG. 9) located under the hull of the marine vessel 10. The first and second marine propulsion devices are rotatable about the first and second steering axes, 21 and 22, respectively. The first marine propulsion device, on the port side of a centerline 24, is configured to be rotatable 45 degrees in a clockwise direction, viewed from above the marine vessel 10, and 15 degrees in a counterclockwise direction. The second marine propulsion device, located on the starboard side of the centerline 24, is oppositely configured to rotate 15 degrees in a clockwise direction and 45 degrees in a counterclockwise direction. The ranges of rotation of the first and second marine propulsion devices are therefore symmetrical about the centerline 24 in a preferred embodiment.

The positioning method of the present disclosure rotates the first and second propulsion devices about their respective steering axes, 21 and 22, in an efficient manner that allows rapid and accurate maneuvering of the marine vessel 10. This efficient maneuvering of the first and second marine propulsion devices is particularly beneficial when the operator of the marine vessel 10 is docking the marine vessel or attempting to maneuver it in areas where obstacles exist, such as within a marina.

FIG. 2 illustrates one element of the present disclosure that is used when it is desired to move the marine vessel 10 in a direction represented by arrow 30. In other words, it represents the situation when the operator of the marine vessel wishes to cause it to sidle to the right with no movement in either a forward or reverse direction and no rotation about its center of gravity 12. This is done by rotating the first and second marine propulsion devices so that their thrust vectors, T1 and T2, are both aligned with the center of gravity 12. This provides no effective moment arm about the center of gravity 12 for the thrust vectors, T1 and T2, to exert a force that could otherwise cause the marine vessel 10 to rotate. As can be seen in FIG. 2, the first and second thrust vectors, T1 and T2, are in opposite directions and are equal in magnitude to each other. This creates no resultant forward or reverse force on the marine vessel 10. The first and second thrust vectors are directed along lines 31 and 32, respectively, which intersect at the center of gravity 12. As illustrated in FIG. 2, these two lines, 31 and 32, are positioned at angles theta. As such, the first and second marine propulsion devices are rotated symmetrically relative to the centerline 24. As will be described in greater detail below, the first and second thrust vectors, T1 and T2, can be resolved into components, parallel to centerline 24, that are calculated as a function of the sine of angle theta. These thrust components in a direction parallel to centerline 24 effectively cancel each other if the thrust vectors, T1 and T2, are equal to each other since the absolute magnitudes of the angles theta are equal to each other. Movement in the direction represented by arrow 30 results from the components of the first and second thrust vectors, T1 and T2, being resolved in a direction parallel to arrow 30 (i.e. perpendicular to centerline 24) as a function of the cosine of angle theta. These two resultant thrust components which are parallel to arrow 30 are additive. As described above, the moment about the center of gravity 12 is equal to zero because both thrust vectors, T1 and T2, pass through the center of gravity 12 and, as a result, have no moment arms about that point.

While it is recognized that many other positions of the thrust, T1 and T2, may result in the desired sidling represented by arrow 30, the direction of the thrust vectors in line with the center of gravity 12 of the marine vessel 10 is most effective and is easy to implement. It also minimizes the overall movement of the propulsion devices during complicated maneuvering of the marine vessel 10. Its effectiveness results from the fact that the magnitudes of the first and second thrusts need not be perfectly balanced in order to avoid the undesirable rotation of the marine vessel 10. Although a general balancing of the magnitudes of the first and second thrusts is necessary to avoid the undesirable forward or reverse movement, no rotation about the center of gravity 12 will occur as long as the thrusts are directed along lines, 31 and 32, which intersect at the center of gravity 12 as illustrated in FIG. 2.

Figure 3:
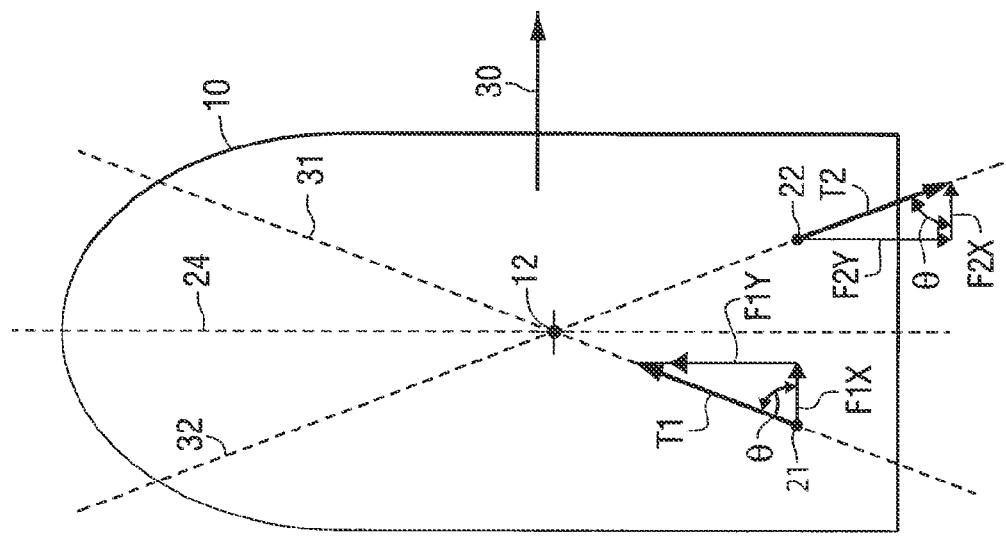

FIG. 3 shows the first and second thrust vectors, T1 and T2, and the resultant forces of those two thrust vectors. For example, the first thrust vector can be resolved into a forward directed force F1Y and a side directed force F1X as shown in FIG. 3 by multiplying the first thrust vector T1 by the sine of theta and the cosine of theta, respectively. Similarly, the second thrust vector T2 is shown resolved into a rearward directed force F2Y and a side directed force F2X by multiplying the second thrust vector T2 by the sine of theta and cosine of theta, respectively. Since the forward force F1Y and rearward force F2Y are equal to each other, they cancel and no resulting forward or reverse force is exerted on the marine vessel 10. The side directed forces, F1X and F2X, on the other hand, are additive and result in the sidle movement represented by arrow 30. Because the lines, 31 and 32, intersect at the center of gravity 12 of the marine vessel 10, no resulting moment is exerted on the marine vessel. As a result, the only movement of the marine vessel 10 is the sidle movement represented by arrow 30.

Figure 4:
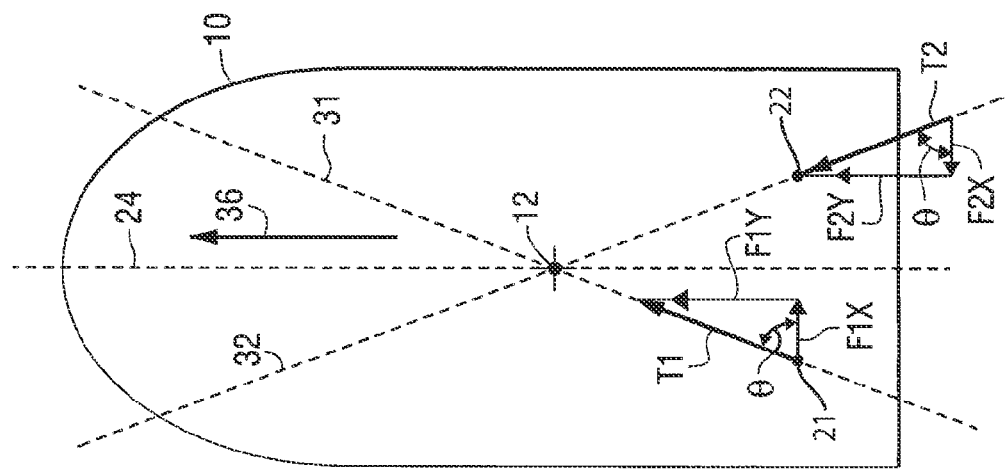
FIG. 4 shows the arrangement of thrust vectors for a forward movement.

FIG. 4 shows the result when the operator of the marine vessel 10 wishes to move in a forward direction, with no side movement and no rotation about the center of gravity 12. The first and second thrusts, T1 and T2, are directed along their respective lines, 31 and 32, and they intersect at the center of gravity 12. Both thrusts, T1 and T2, are exerted in a generally forward direction along those lines. As a result, these thrusts resolve into the forces illustrated in FIG. 4. Side directed forces F1X and F2X are equal to each other and in opposite directions. Therefore, they cancel each other and no sidle force is exerted on the marine vessel 10. Forces F1Y and F2Y, on the other hand, are both directed in a forward direction and result in the movement represented by arrow 36. The configuration of the first and second marine propulsion systems represented in FIG. 4 result in no side directed movement of the marine vessel 10 or rotation about its center of gravity 12. Only a forward movement 36 occurs.

When it is desired that the marine vessel 10 be subjected to a moment to cause it to rotate about its center of gravity 12, the application of the concepts of the present disclosure depend on whether or not it is also desired that the marine vessel 10 be subjected to a linear force in either the forward/reverse or the left/right direction or a combination of both. When the operator wants to cause a combined movement, with both a linear force and a moment exerted on the marine vessel, the thrust vectors, T1 and T2, are caused to intersect at the point 38 as represented by dashed lines 31 and 32 in FIG. 6. If, on the other hand, the operator of the marine vessel wishes to cause it to rotate about its center of gravity 10 with no linear movement in either a forward/reverse or a left/right direction, the thrust vectors, T1' and T2', are aligned in parallel association with each other and the magnitude of the first and second thrust vectors are directed in opposite directions as represented by dashed arrows T1' and T2' in FIG. 6. When the first and second thrust vectors, T1' and T2', are aligned in this way, the angle theta for both vectors is equal to 90 degrees and their alignment is symmetrical with respect to the centerline 24, but with oppositely directed thrust magnitudes.

Figure 5:
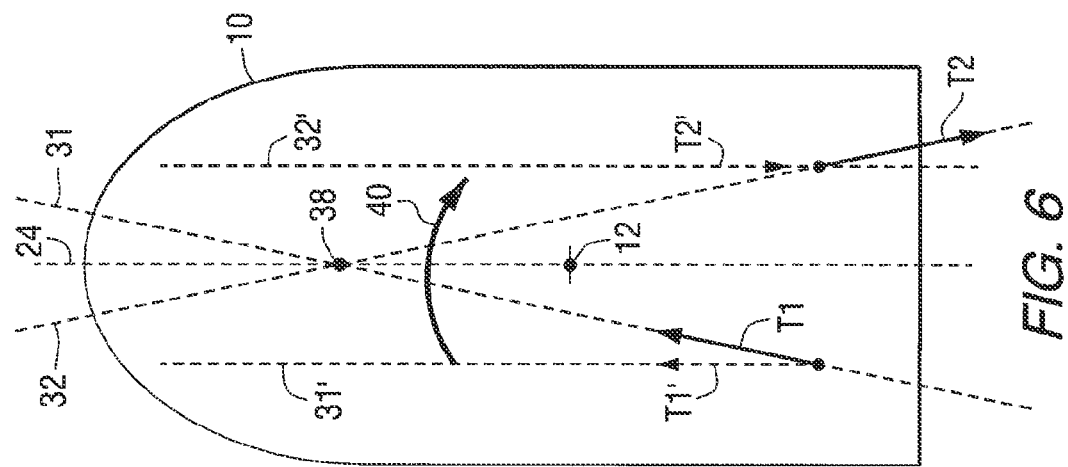
FIG. 5 illustrates the geometry associated with the calculation of a moment arm relative to the center of gravity of a marine vessel.

When a rotation of the marine vessel 10 is desired in combination with linear movement, the first and second marine propulsion devices are rotated so that their thrust vectors intersect at a point on the centerline 24 other than the center of gravity 12 of the marine vessel 10. This is illustrated in FIG. 5. Although the thrust vectors, T1 and T2, are not shown in FIG. 5, their associated lines, 31 and 32, are shown intersecting at a point 38 which is not coincident with the center of gravity 12. As a result, an effective moment arm MI exists with respect to the first marine propulsion device which is rotated about its first steering axis 21. Moment arm M1 is perpendicular to dashed line 31 along which the first thrust vector is aligned. As such, it is one side of a right triangle which also comprises a hypotenuse H. It should also be understood that another right triangle in FIG. 5 comprises sides L, W/2, and the hypotenuse H. Although not shown in FIG. 5, for purposes of clarity, a moment arm M2 of equal magnitude to moment arm M1 would exist with respect to the second thrust vector directed along line 32. Because of the intersecting nature of the thrust vectors, they each resolve into components in both the forward/reverse and left/right directions. The components, if equal in absolute magnitude to each other, may either cancel each other or be additive. If unequal in absolute magnitude, they may partially offset each other or be additive. However, a resultant force will exist in some linear direction when the first and second thrust vectors intersect at a point 38 on the centerline 24.

With continued reference to FIG. 5, those skilled in the art recognize that the length of the moment arm M1 can be determined as a function of angle theta, angle PHI, angle PI, the distance between the first and second steering axes, 21 and 22, which is equal to W in FIG. 5, and the perpendicular distance between the center of gravity 12 and a line extending between the first and second steering axes. This perpendicular distance is identified as L in FIG. 5. The length of the line extending between the first steering axis 21 and the center of gravity 12 is the hypotenuse of the triangle shown in FIG. 5 and can easily be determined. The magnitude of angle PHI is equivalent to the arctangent of the ratio of length L to the distance between the first steering axis 21 and the centerline 24, which is identified as W/2 in FIG. 5. Since the length of line H is known and the magnitude of angle H is known, the length of the moment arm M1 can be mathematically determined.

Figure 6:
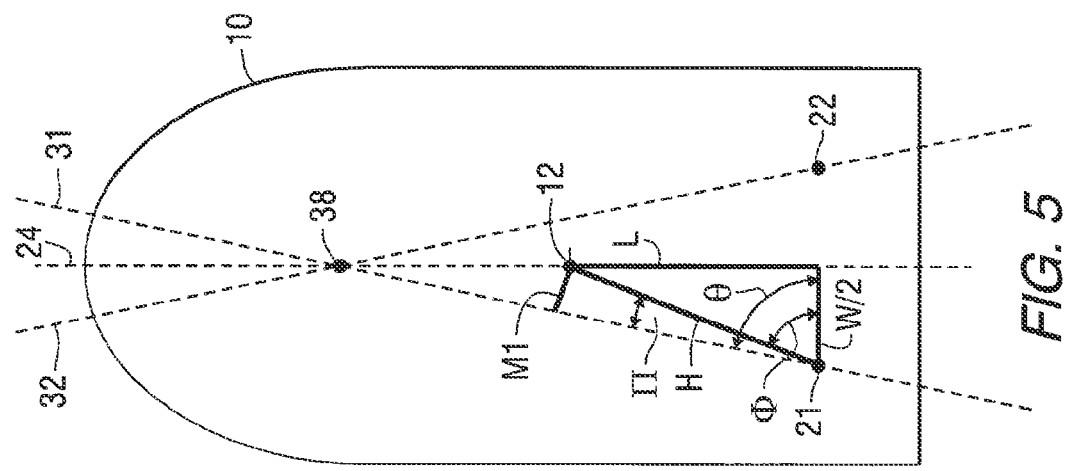
FIG. 6 shows the arrangement of thrust vectors used to rotate the marine vessel about its center of gravity.

As described above, a moment, represented by arrow 40 in FIG. 6, can be imposed on the marine vessel 10 to cause it to rotate about its center of gravity 12. The moment can be imposed in either rotational direction. In addition, the rotating force resulting from the moment 40 can be applied either in combination with a linear force on the marine vessel or alone. In order to combine the moment 40 with a linear force, the first and second thrust vectors, T1 and T2, are positioned to intersect at the point 38 illustrated in FIG. 6. The first and second thrust vectors, T1 and T2, are aligned with their respective dashed lines, 31 and 32, to intersect at this point 38 on the centerline 24 of the marine vessel. If, on the other hand, it is desired that the moment 40 be the only force on the marine vessel 10, with no linear forces, the first and second thrust vectors, represented by T1' and T2' in FIG. 6, are aligned in parallel association with each other. This, effectively, causes angle theta to be equal to 90 degrees. If the first and second thrust vectors, T1' and T2', are then applied with equal magnitudes and in opposite directions, the marine vessel 10 will be subjected only to the moment 40 and to no linear forces. This will cause the marine vessel 10 to rotate about its center of gravity 12 while not moving in either the forward/reverse or the left/right directions.

In FIG. 6, the first and second thrust vectors, T1 and T2, are directed in generally opposite directions and aligned to intersect at the point 38 which is not coincident with the center of gravity 12. Although the construction lines are not shown in FIG. 6, effective moment arms, M1 and M2, exist with respect to the first and second thrust vectors and the center of gravity 12. Therefore, a moment is exerted on the marine vessel 10 as represented by arrow 40. If the thrust vectors T1 and T2 are equal to each other and are exerted along lines 31 and 32, respectively, and these are symmetrical about the centerline 24 and in opposite directions, the net component forces parallel to the centerline 24 are equal to each other and therefore no net linear force is exerted on the marine vessel 10 in the forward/reverse directions. However, the first and second thrust vectors, T1 and T2, also resolve into forces perpendicular to the centerline 24 which are additive. As a result, the marine vessel 10 in FIG. 6 will move toward the right as it rotates in a clockwise direction in response to the moment 40.

In order to obtain a rotation of the marine vessel 10 with no lateral movement in the forward/reverse or left/right directions, the first and second thrust vectors, represented as T1' and T2' in FIG. 6, are directed along dashed lines, 31' and 32', which are parallel to the centerline 24. The first and second thrust vectors, T1' and T2', are of equal and opposite magnitude. As a result, no net force is exerted on the marine vessel 10 in a forward/reverse direction. Since angle theta, with respect to thrust vectors T1' and T2', is equal to 90 degrees, no resultant force is exerted on the marine vessel 10 in a direction perpendicular to the centerline 24. As a result, a rotation of the marine vessel 10 about its center of gravity 12 is achieved with no linear movement.

Figure 7:
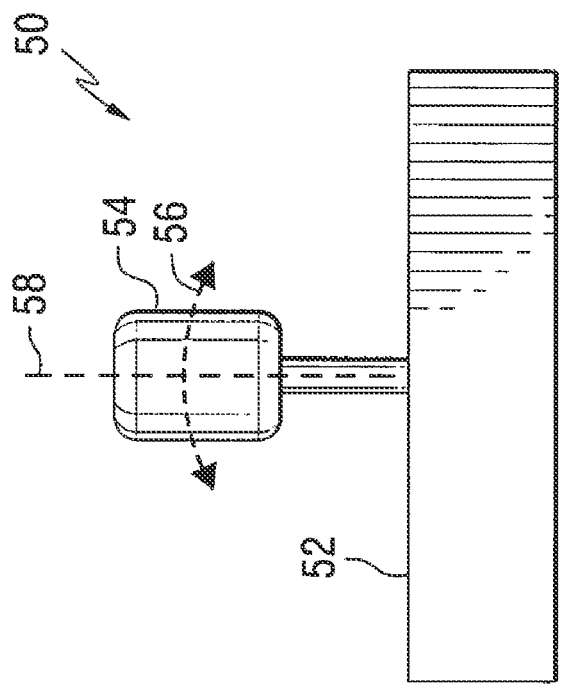

FIG. 7 is a simplified schematic representation of a joystick 50 which provides a manually operable control device which can be used to provide a signal that is representative of a desired movement, selected by an operator, relating to the marine vessel. Many different types of joysticks are known to those skilled in the art. The schematic representation in FIG. 7 shows a base portion 52 and a handle 54 which can be manipulated by hand. In a typical application, the handle is movable in the direction generally represented by arrow 56 and is also rotatable about an axis 58. It should be understood that the joystick handle 54 is movable, by tilting it about its connection point in the base portion 52 in virtually any direction. Although dashed line 56 is illustrated in the plane of the drawing in FIG. 7, a similar type movement is possible in other directions that are not parallel to the plane of the drawing.

Figure 8:
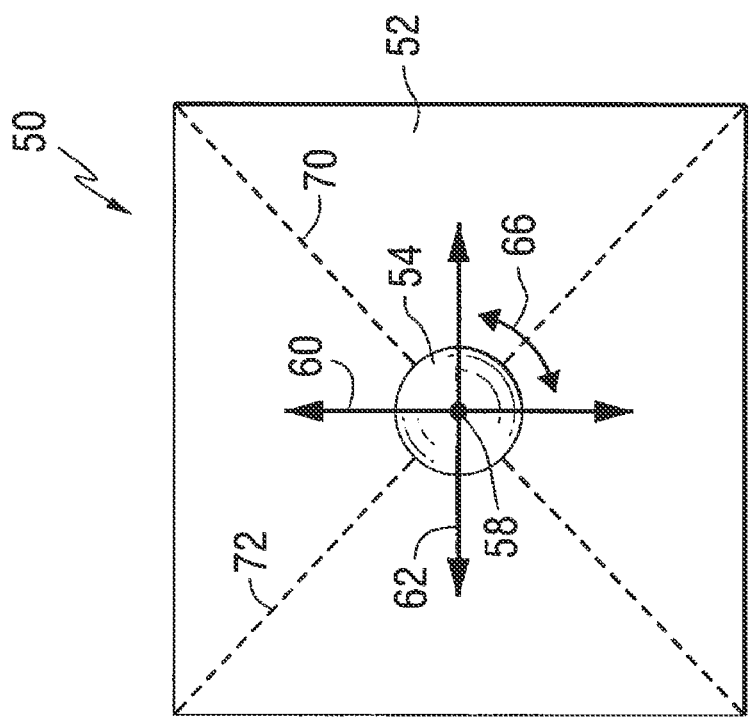
FIGS. 7 and 8 are two schematic representation of a joystick used in conjunction with the presently described embodiments.

FIG. 8 is a top view of the joystick 50. The handle 54 can move, as indicated by arrow 56 in FIG. 7, in various directions which include those represented by arrows 60 and 62. However, it should be understood that the handle 54 can move in any direction relative to axis 58 and is not limited to the two lines of movement represented by arrows 60 and 62. In fact, the movement of the handle 54 has a virtually infinite number of possible paths as it is tilted about its connection point within the base 52. The handle 54 is also rotatable about axis 58, as represented by arrow 66. Those skilled in the art are familiar with many different types of joystick devices that can be used to provide a signal that is representative of a desired movement of the marine vessel, as expressed by the operator of the marine vessel through movement of the handle 54.

With continued reference to FIG. 8, it can be seen that the operator can demand a purely linear movement either toward port or starboard, as represented by arrow 62, a purely linear movement in a forward or reverse direction as represented by arrow 60, or any combination of the two. In other words, by moving the handle 54 along dashed line 70, a linear movement toward the right side and forward or toward the left side and rearward can be commanded. Similarly, a linear movement along lines 72 could be commanded. Also, it should be understood that the operator of the marine vessel can request a combination of sideways or forward/reverse linear movement in combination with a rotation as represented by arrow 66. Any of these possibilities can be accomplished through use of the joystick 50. 5 The magnitude, or intensity, of movement represented by the position of the handle 54 is also provided as an output from the joystick. In other words, if the handle 54 is moved slightly toward one side or the other, the commanded thrust in that direction is less than if, alternatively, the handle 54 was moved by a greater magnitude away from its vertical position with respect to the base 52. Furthermore, rotation of the handle 54 about axis 58, as represented by arrow 66, provides a signal representing the intensity of desired movement. A slight rotation of the handle about axis 58 would represent a command for a slight rotational thrust about the center of gravity 12 of the marine vessel 10. On the other hand, a more intense rotation of the handle 54 about its axis would represent a command for a higher magnitude of rotational thrust.

With reference to FIGS. 1-8, it can be seen that movement of the joystick handle 54 can be used by the operator of the marine vessel 10 to represent virtually any type of desired movement of the vessel. In response to receiving a signal from the joystick 50, an algorithm, in accordance with a preferred embodiment, determines whether or not a rotation 40 about the center of gravity 12 is requested by the operator. If no rotation is requested, the first and second marine propulsion devices are rotated so that their thrust vectors align, as shown in FIGS. 2-4, with the center of gravity 12 and intersect at that point. This results in no moment being exerted on the marine vessel 10 regardless of the magnitudes or directions of the first and second thrust vectors, T1 and T2. The magnitudes and directions of the first and second thrust vectors are then determined mathematically, as described above in conjunction with FIGS. 3 and 4. If, on the other hand, the signal from the joystick 50 indicates that a rotation about the center of gravity 12 is requested, the first and second marine propulsion devices are directed along lines, 31 and 32, that do not intersect at the center of gravity 12. Instead, they intersect at another point 38 along the centerline 24. As shown in FIG. 6, this intersection point 38 can be forward from the center of gravity 12. The thrusts, T1 and T2, shown in FIG. 6 result in a clockwise rotation 40 of the marine vessel 10. Alternatively, if the first and second marine propulsion devices are rotated so that they intersect at a point along the centerline 24 which is behind the center of gravity 12, an opposite effect would be realized. It should also be recognized that, with an intersect point 38 forward from the center of gravity 12, the directions of the first and second thrusts, T1 and T2, could be reversed to cause a rotation of the marine vessel 10 in a counterclockwise direction.

In the various maneuvering steps described in conjunction with FIGS. 1-6, it can be seen that the first and second marine propulsion devices are directed so that they intersect along the centerline 24. That point of intersection can be at the center of gravity 12 or at another point such as point 38. In addition, the lines, 31 and 32, along which the first and second thrust vectors are aligned, are symmetrical in all cases. In other words, the first and second marine propulsion devices are positioned at angles theta relative to a line perpendicular to the centerline 24. The thrust vectors are, however, aligned in opposite directions relative to the centerline 24 so that they are symmetrical to the centerline even though they may be in opposite directions as illustrated in FIG. 6.

While it is recognized that the movements of the marine vessel 10 described above can be accomplished by rotating the marine propulsion devices in an asymmetrical way, contrary to the description of the present disclosure in relation to FIGS. 1-6, the speed and consistency of movement are enhanced by the consistent alignment of the first and second thrust vectors at points along the centerline 24 and, when no rotation about the center of gravity 12 is required, at the center of gravity itself. This symmetrical movement and positioning of the first and second marine propulsion devices simplifies the necessary calculations to determine the resolved forces and moments and significantly reduces the effects of any errors in the thrust magnitudes.

As described above, in conjunction with FIGS. 1-6, the first and second thrust vectors, T1 and T2, can result from either forward or reverse operation of the propellers of the first and second marine propulsion devices. In other words, with respect to FIG. 6, the first thrust vector T1 would typically be provided by operating the first marine propulsion device in forward gear and the second thrust vector T2 would be achieved by operating the second marine propulsion device in reverse gear. However, as is generally recognized by those skilled in the art, the resulting thrust obtained from a marine propulsion device by operating it in reverse gear is not equal in absolute magnitude to the resulting thrust achieved by operating the propeller in forward gear. This is the result of the shape and hydrodynamic effects caused by rotating the propeller in a reverse direction. However, this effect can be determined and calibrated so that the rotational speed (RPM) of the reversed propeller can be selected in a way that the effective resulting thrust can be accurately predicted. In addition, the distance L between the line connecting the first and second steering axes, 21 and 22, and the center of gravity 12 must be determined for the marine vessel 10 so that the operation of the algorithm of the present disclosure is accurate and optimized. This determination is relatively easy to accomplish. Initially, a presumed location of the center of gravity 12 is determined from information relating to the structure of the marine vessel 10. With reference to FIG. 3, the first and second marine propulsion devices are then aligned so that their axes, 31 and 32, intersect at the presumed location of the center of gravity 12. Then, the first and second thrusts, T1 and T2, are applied to achieve the expected sidle movement 30. If any rotation of the marine vessel 10 occurs, about the actual center of gravity, the length L (illustrated in FIG. 5) is presumed to be incorrect. That length L in the microprocessor is then changed slightly and the procedure is repeated. When the sidle movement 30 occurs without any rotation about the currently assumed center of gravity, it can be concluded that the currently presumed location of the center of gravity 12 and the magnitude of length L are correct. It should be understood that the centerline 24, in the context of the present disclosure, is a line which extends through the center of gravity of the marine vessel 10. It need not be perfectly coincident with the keel line of the marine vessel, but it is expected that in most cases it will be.

As mentioned above, propellers do not have the same effectiveness when operated in reverse gear than they do when operated in forward gear for a given rotational speed. Therefore, with reference to FIG. 3, the first thrust T1 would not be perfectly equal to the second thrust T2 if the two propellers systems were operated at identical rotational speeds. In order to determine the relative efficiency of the propellers when they are operated in reverse gear, a relatively simple calibration procedure can be followed. With continued reference to FIG. 3, first and second thrusts, T1 and T2, are provided in the directions shown and aligned with the center of gravity 12. This should produce the sidle movement 30 as illustrated. However, this assumes that the two thrust vectors, T1 and T2, are equal to each other. In a typical calibration procedure, it is initially assumed that the reverse operating propeller providing the second thrust T2 would be approximately 80% as efficient as the forward operating propeller providing the first thrust vector T1. The rotational speeds were selected accordingly, with the second marine propulsion device operating at 125% of the speed of the first marine propulsion device. If a forward or reverse movement is experienced by the marine vessel 10, that initial assumption would be assumed to be incorrect. By slightly modifying the assumed efficiency of the reverse operating propeller, the system can eventually be calibrated so that no forward or reverse movement of the marine vessel 10 occurs under the situation illustrated in FIG. 3. In an actual example, this procedure was used to determine that the operating efficiency of the propellers, when in reverse gear, is approximately 77% of their efficiency when operated in forward gear. Therefore, in order to balance the first and second thrust vectors, T1 and T2, the reverse operating propellers of the second marine propulsion device would be operated at a rotational speed (i.e. RPM) which is approximately 29.87% greater than the rotational speed of the propellers of the first marine propulsion device. Accounting for the inefficiency of the reverse operating propellers, this technique would result in generally equal magnitudes of the first and second thrust vectors, T1 and T2.

Figure 9:
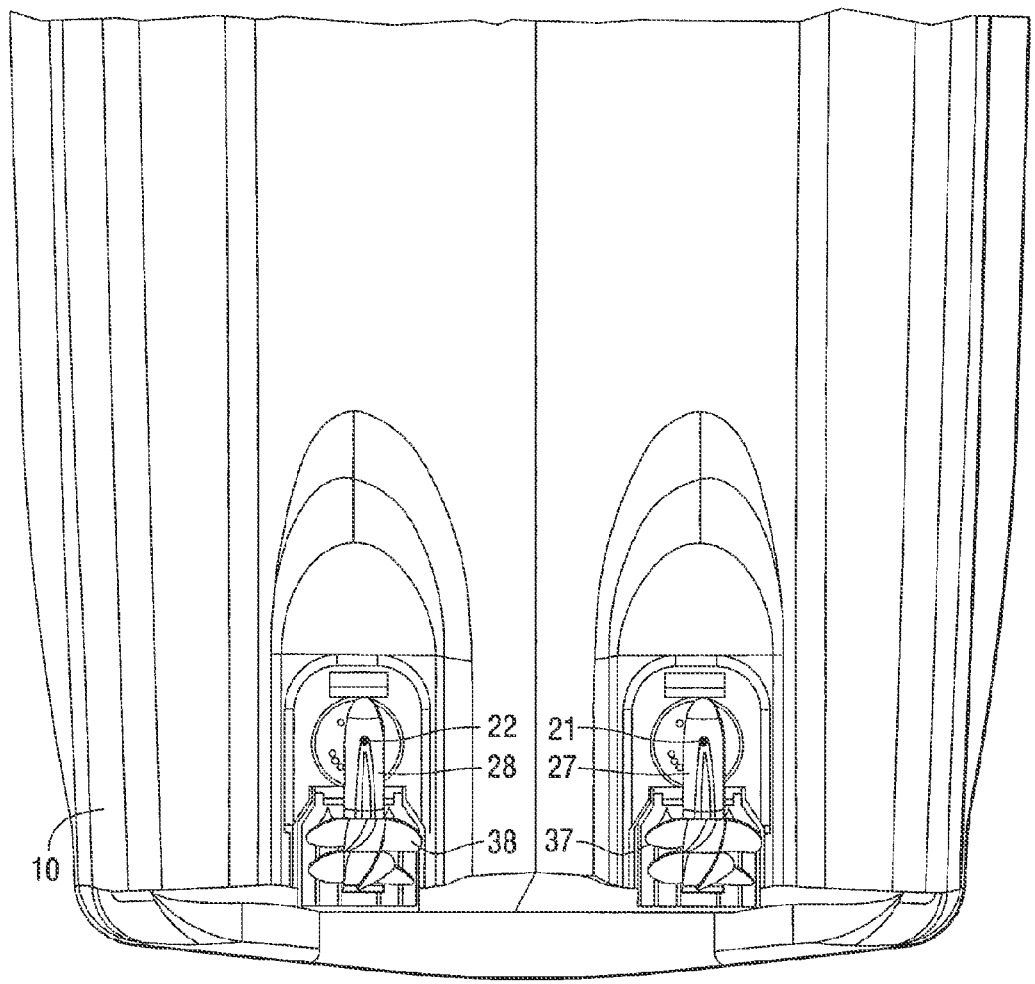
FIG. 9 is a bottom view of the hull of a marine vessel showing the first and second marine propulsion devices extending therethrough.

FIG. 9 is an isometric view of the bottom portion of a hull of a marine vessel 10, showing first and second marine propulsion devices, 27 and 28, and propellers, 37 and 38, respectively. The first and second marine propulsion devices, 27 and 28, are rotatable about generally vertical steering axes, 21 and 22, as described above. In order to avoid interference with portions of the hull of the marine vessel 10, the two marine propulsion devices are provided with limited rotational steering capabilities as described above. Neither the first nor the second marine propulsion device is provided, in a particularly preferred embodiment of the present disclosure, with the capability of rotating 360 degrees about its respective steering axis, 21 or 22.

Figure 10:
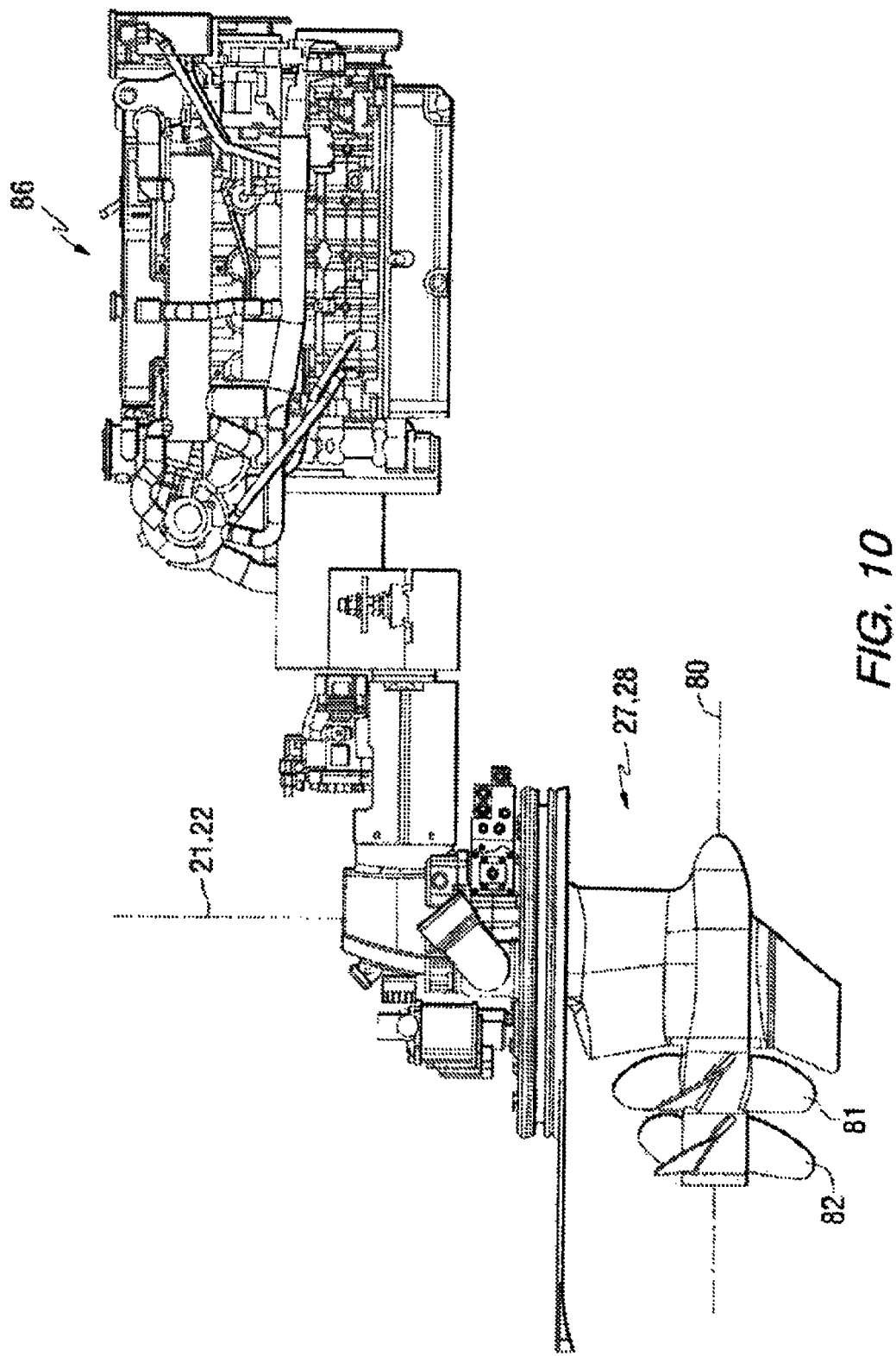
FIG. 10 is a side view showing the arrangement of an engine, steering mechanism, and marine propulsion device used in conjunction with the presently described embodiments.

FIG. 10 is a side view showing the arrangement of a marine propulsion device, such as 27 or 28, associated with a mechanism that is able to rotate the marine propulsion device about its steering axis, 21 or 22. Although not visible in FIG. 10, the driveshaft of the marine propulsion device extends vertically and parallel to the steering axis and is connected in torque transmitting relation with a generally horizontal propeller shaft that is rotatable about a propeller axis 80. The embodiment shown in FIG. 10 comprises two propellers, 81 and 82, that are attached to the propeller shaft. The motive force to drive the propellers, 81 and 82, is provided by an internal combustion engine 86 that is located within the bilge of the marine vessel 10. It is configured with its crankshaft aligned for rotation about a horizontal axis. In a particularly preferred embodiment, the engine 86 is a diesel engine. Each of the two marine propulsion devices, 27 and 28, is driven by a separate engine 86. In addition, each of the marine propulsion devices, 27 and 28, are independently steerable about their respective steering axes, 21 or 22. The steering axes, 21 and 22, are generally vertical and parallel to each other. They are not intentionally configured to be perpendicular to the bottom surface of the hull. Instead, they are generally vertical and intersect the bottom surface of the hull at an angle that is not equal to 90 degrees when the bottom surface of the hull is a V-type hull or any other shape which does not include a flat bottom.

With continued reference to FIG. 10, the submerged portion of the marine propulsion device, 27 or 28, contains rotatable shafts, gears, and bearings which support the shafts and connect the driveshaft to the propeller shaft for rotation of the propellers. No source of motive power is located below the hull surface. The power necessary to rotate the propellers is solely provided by the internal combustion engine. Alternate propulsion means could be employed such as an electronic motor and/or the like.

Figure 11:
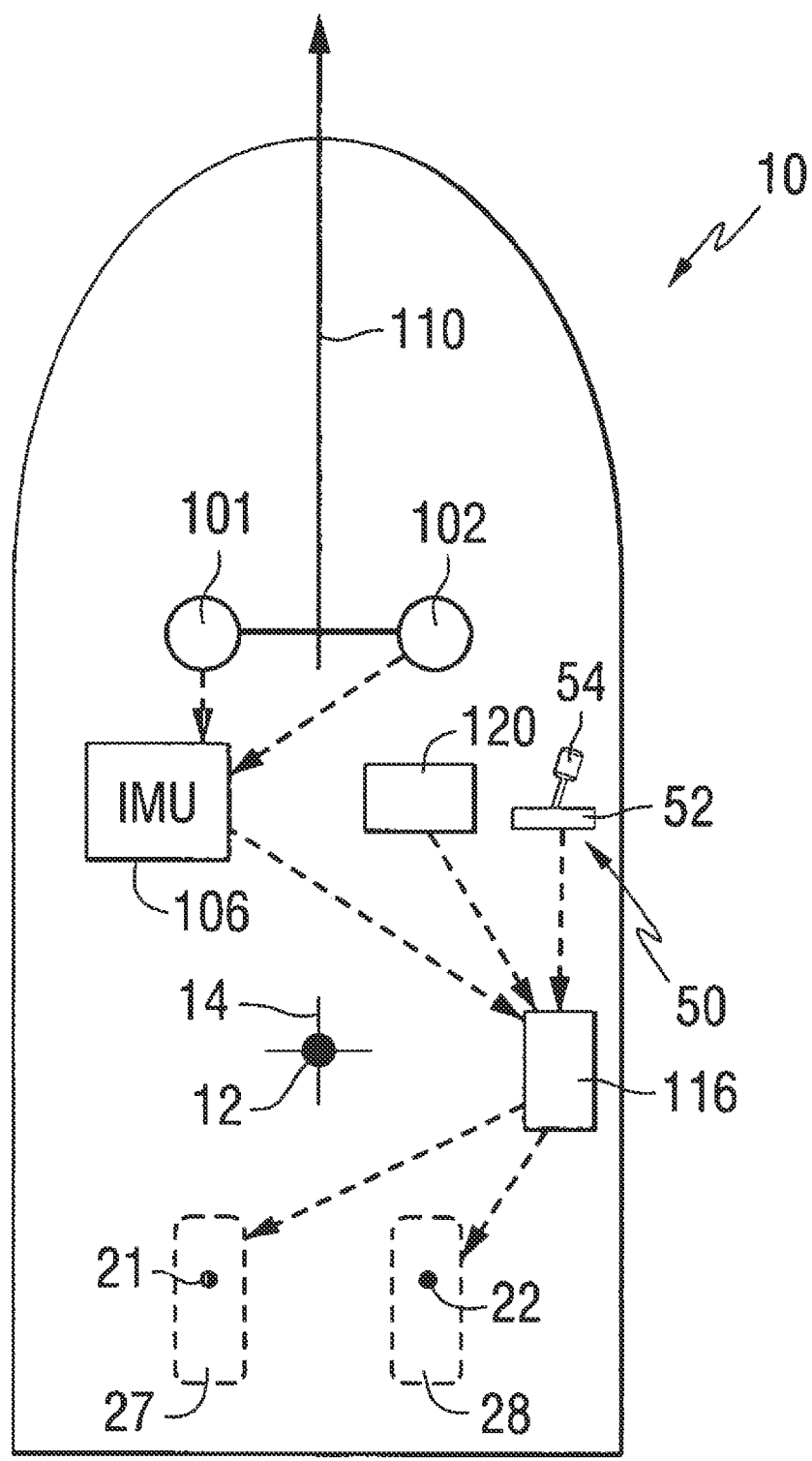
FIG. 11 is a schematic representation of a marine vessel equipped with the devices for performing the station keeping function of the presently described embodiments.

FIG. 11 is a schematic representation of a marine vessel 10 which is configured to perform the steps of a preferred embodiment relating to a method for maintaining a marine vessel in a selected position. The marine vessel 10 is provided with a global positioning system (GPS) which, in a preferred embodiment, comprises a first GPS device 101 and a second GPS device 102 which are each located at a preselected fixed position on the marine vessel 10. Signals from the GPS devices are provided to an inertial measurement unit (IMU) 106. The IMU is identified as model RT3042 and is available in commercial quantities from Oxford Technology. In certain embodiments of the IMU 106, it comprises a differential correction receiver, accelerometers, angular rate sensors, and a microprocessor which manipulates the information obtained from these devices to provide information relating to the current position of the marine vessel 10, in terms of longitude and latitude, the current heading of the marine vessel 10, represented by arrow 110 in FIG. 11, and the velocity and acceleration of the marine vessel 10 in six degrees of freedom.

FIG. 11 also shows a microprocessor 116 which receives inputs from the IMU 106. The microprocessor 116 also receives information from a device 120 which allows the operator of the marine vessel 10 to provide manually selectable modes of operation. As an example, the device 120 can be an input screen that allows the operator of the marine vessel to manually select various modes of operation associated with the marine vessel 10. One of those selections made by the operator of the marine vessel can provide an enabling signal which informs the microprocessor 116 that the operator desires to operate the vessel 10 in a station keeping mode in order to maintain the position of the marine vessel in a selected position. In other words, the operator can use the device 120 to activate the present system so that the marine vessel 10 is maintained at a selected global position (e.g. a selected longitude and latitude) and a selected heading (e.g. with arrow 110 being maintained at a fixed position relative to a selected compass point).

With continued reference to FIG. 11, a manually operable control device, such as the joystick 50, can also be used to provide a signal to the microprocessor 116. As described above, the joystick 50 can be used to allow the operator of the marine vessel 10 to manually maneuver the marine vessel. It can also provide information to the microprocessor 116 regarding its being in an active status or inactive status. While the operator is manipulating the joystick 50, the joystick is in an active status. However, if the operator releases the joystick 50 and allows the handle 54 to return to its centered and neutral position, the joystick 50 reverts to an inactive status. As will be described in greater detail below, a particularly preferred embodiment can use the information relating to the active or inactive status of the joystick 50 in combination with an enabling mode received from the device 120 to allow the operator to select the station keeping mode of the present disclosure. In this embodiment, the operator can use the joystick 50 to manually maneuver the marine vessel 10 into a particularly preferred position, represented by a global position and a heading, and then release the joystick 50 to immediately and automatically request the control system to maintain that newly achieved global position and heading. This embodiment can be particularly helpful during docking procedures.

As described above, the first and second marine propulsion devices, 27 and 28, are steerable about their respective axes, 21 and 22. Signals provided by the microprocessor 116 allow the first and second marine propulsion devices to be independently rotated about their respective steering axes in order to coordinate the movement of the marine vessel 10 in response to operator commands.

Figure 12:
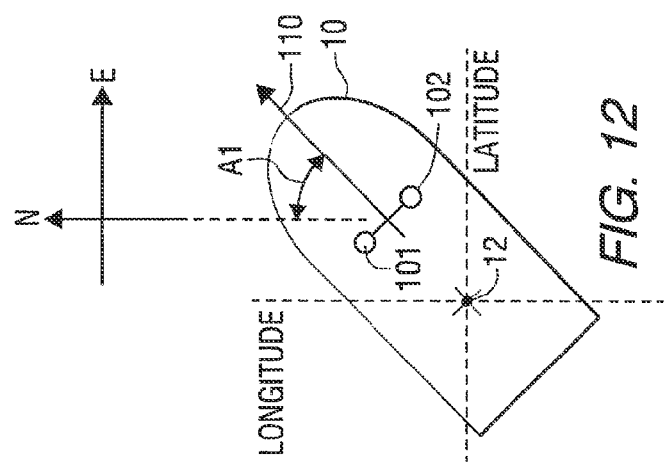
FIG. 12 is a representation of a marine vessel at a particular global position and with a particular heading which are exemplary.

FIG. 12 shows a marine vessel 10 at an exemplary global position, measured as longitude and latitude, and an exemplary heading represented by angle A1 between the heading arrow 110 of the marine vessel 10 and a due north vector. Although alternative position defining techniques can be used in conjunction with the presently described embodiments, a preferred embodiment uses both the global position and heading of the vessel 10 for the purpose of determining the current position of the vessel and calculating the necessary position corrections to return the vessel to its position.

As described above, GPS devices, 101 and 102, are used by the IMU 106 to determine the information relating to its position. For purposes of describing a preferred embodiment, the position will be described in terms of the position of the center of gravity 12 of the marine vessel and a heading vector 110 which extends through the center of gravity. However, it should be understood that alternative locations on the marine vessel 10 can be used for these purposes. The IMU 106, described above in conjunction with FIG. 11, provides a means by which this location on the marine vessel 10 can be selected.

The station keeping function, where it maintains the desired global position and desired heading of the marine vessel, can be activated in several ways. In a simple embodiment, the operator of the marine vessel 10 can actuate a switch that commands the microprocessor 116 to maintain the current position whenever the switch is actuated. In a particularly preferred embodiment, the station keeping mode is activated when the operator of the marine vessel enables the station keeping, or position maintaining, function and the joystick 50 is inactive. If the station keeping mode is enabled, but the joystick is being manipulated by the operator of the marine vessel 10, a preferred embodiment temporarily deactivates the station keeping mode because of the apparent desire by the operator of the marine vessel to manipulate its position manually. However, as soon as the joystick 50 is released by the operator, this inactivity of the joystick in combination with the enabled station keeping mode causes the preferred embodiment of to resume its position maintaining function.

Figure 13:
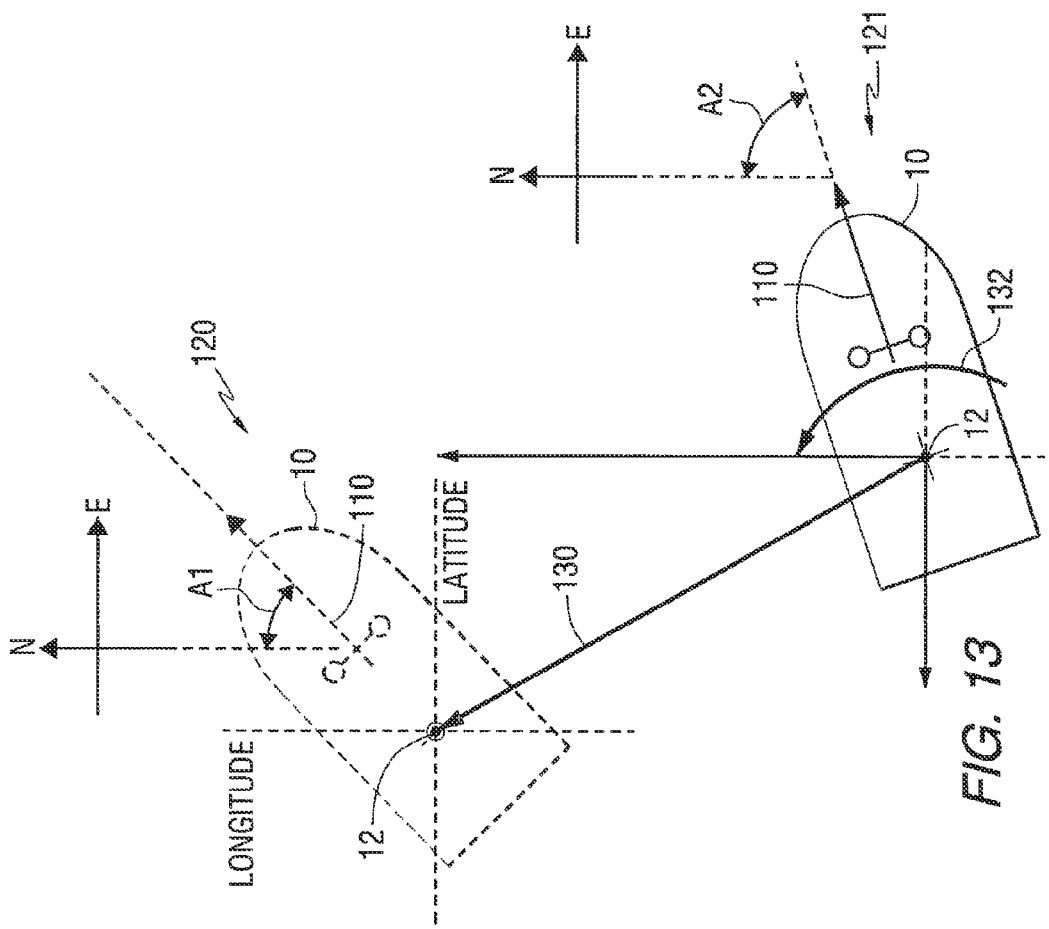
FIG. 13 shows a marine vessel which has moved from an initial position to a subsequent position.

FIG. 13 is a schematic representation that shows the marine vessel 10 in two exemplary positions. An initial, or desired, position 120 is generally identical to that described above in conjunction with FIG. 12. Its initial position is defined by a global position and a heading. The global position is identified by the longitude and latitude of the center of gravity 12 when the vessel 10 was at its initial, or desired, position 120. The heading, represented by angle A1, is associated with the vessel heading when it was at its initial position 120.

Assuming that the vessel 10 moved to a subsequent position 121, the global position of its center of gravity 12 moved to the location represented by the subsequent position 121 of the vessel 10. In addition, the marine vessel 10 is illustrated as having rotated slightly in a clockwise direction so that its heading vector 110 is now defined by a larger angle A2 with respect to a due north vector.

With continued reference to FIG. 13, it should be understood that the difference in position between the initial position 120 and the later position 121 is significantly exaggerated so that the response by the system can be more clearly described. A preferred embodiment determines a difference between a desired position, such as the initial position 120, and the current position, such as the subsequent position 121 that resulted from the vessel 10 drifting. This drift of the vessel 10 can occur because of wind, tide, or current.

The current global position and heading of the vessel is compared to the previously stored desired global position and heading. An error, or difference, in the north, east and heading framework is computed as the difference between the desired global position and heading and the actual global position and heading. This error, or difference, is then converted to an error, or difference, in the forward, right and heading framework of the vessel which is sometimes referred to as the body framework. These vessel framework error elements are then used by the control strategies that will be described in greater detail below which attempt to simultaneously null the error, or difference, elements. Through the use of a PID controller, a desired force is computed in the forward and right directions, with reference to the marine vessel, along with a desired YAW moment relative to the marine vessel in order to null the error elements. The computed force and moment elements are then transmitted to the vessel maneuvering system described above which delivers the requested forces and moments by positioning the independently steerable marine propulsion drives, controlling the power provided to the propellers of each drive, and controlling the thrust vector directions of both marine propulsion devices.

The difference between the desired position 120 and the current position 121 can be reduced if the marine vessel 10 is subjected to an exemplary target linear thrust 130 and a target moment 132. The target linear thrust 130 and the target moment 132, in a preferred embodiment, are achieved by a manipulation of the first and second marine propulsion devices as described above in conjunction with FIGS. 2-6. The target linear thrust 130 will cause the marine vessel 10 to move towards its initial, or desired, position which is measured as a magnitude of longitude and latitude. The target moment 132 will cause the marine vessel 10 to rotate about its center of gravity 12 so that its heading vector 110 moves from the current position 121 to the initial position 120. This reduces the heading angle from the larger magnitude of angle A2 to the smaller magnitude of A1. Both the target linear thrust 130 and target moment 132 are computed to decrease the errors between the current global position and heading at location 121 and the desired global position and heading at the desired position 120.

With continued reference to FIG. 13, it should be recognized that the station keeping mode is not always intended to move the marine vessel 10 by significant distances. Instead, its continual response to slight changes in global position and heading will more likely maintain the vessel in position without requiring perceptible movements of the vessel 10. In other words, the first and second marine propulsion devices are selectively activated in response to slight deviations in the global position and heading of the marine vessel and, as a result, large corrective moves such as that which is illustrated in FIG. 13 will not normally be required. As a result, the thrusts provided by the first and second marine propulsion devices continually counter the thrusts on the marine vessel caused by wind, current, and tide so that the net result is an appearance that the marine vessel is remaining stationary and is unaffected by the external forces. However, alternative embodiments could be used to cause the marine vessel 10 to move to a position, defined by a desired global position and heading, that was previously stored in the microprocessor memory. Under those conditions, a relatively larger target linear thrust 130 and target moment 132 could be used to move the vessel 10 to the initial position when that initial position is selected from memory and the station keeping mode is enabled. As an example of this alternate embodiment, a desired position, such as the position identified by reference numeral 120 in FIG. 13, can be stored in the microprocessor and then recalled, perhaps days later, after the operator of the marine vessel 10 has moved the marine vessel to a position in the general vicinity of the stored position 120. In other words, if the operator of the marine vessel maneuvers it to a location, such as the location identified by reference numeral 121 in FIG. 13, the system can be enabled and activated. Under those conditions, the system will cause the marine vessel to move to its stored desired position 120 that was selected and saved at some previous time. This technique could possibly be advantageous in returning the marine vessel to a desirable fishing location or to a docking position after the operator has maneuvered the marine vessel into a position that is generally close to the desired position.

In a particularly preferred embodiment, the microprocessor 116, as described above in conjunction with FIG. 11, allows the operator to manually manipulate the joystick 50 so that the marine vessel is positioned in response to the desire of the operator. As this process continues, the operator of the marine vessel may choose to release the joystick 50. At that instant in time, the station keeping mode is immediately activated, if enabled, and the marine vessel is maintained at the most recent position and heading of the vessel 10 when the joystick 50 initially became inactive as the operator released it. The operator could subsequently manipulate the joystick again to make slight corrections in the position and heading of the vessel. As that is being done, the station keeping mode is temporarily deactivated. However, if the operator of the marine vessel again releases the joystick 50, its inactivity will trigger the resumption of the station keeping method if it had been previously enabled by the operator.

Figure 14:
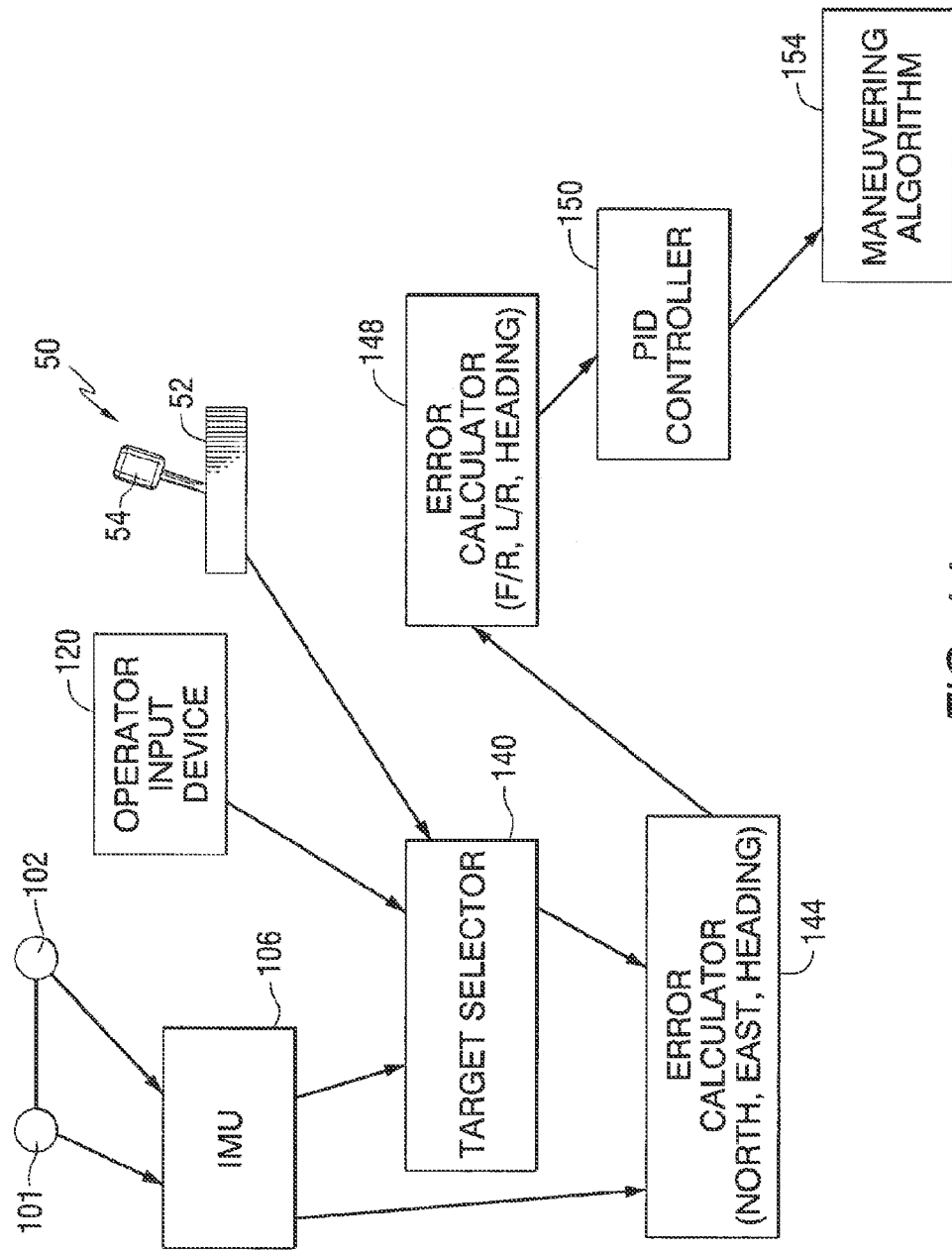
FIG. 14 is a block diagram of the functional elements of the presently described embodiments used to perform a station keeping function.

FIG. 14 is a schematic representation of the devices and software used in conjunction with the preferred embodiment. With references to FIGS. 11-14, the inertial measurement unit (IMU) 106 receives signals from the two GPS devices, 101 and 102, and provides information to the microprocessor 116 in relation to the absolute global position and heading of the marine vessel 10 and in relation to the velocity and acceleration of the marine vessel 10 in six degrees of freedom which include forward and reverse movement of the vessel, left and right movement of the vessel, and both yaw movements of the vessel.

With continued reference to FIG. 14, a target selector portion 140 of the software receives inputs from the IMU 106, the operator input device 120, and the joystick 50. When the station keeping mode is enabled, by an input from the operator of the marine vessel through the operator input device 120, and the joystick 50 is inactive, the target selector receives a current set of magnitudes from the IMU 106 and stores those values as the target global position and target heading for the vessel 10. A preferred embodiment is programmed to obtain this target position information only when the station keeping mode is enabled by the device 120 and the joystick 50 initially becomes inactive after having been active. This target information is stored by the microprocessor 116.

When in the station keeping mode, the IMU 106 periodically obtains new data from the GPS devices, 101 and 102, and provides the position information to an error calculator 144 within the microprocessor 116. This error calculator compares the target global position and target heading to current values of these two variables. That produces a difference magnitude which is defined in terms of a north-south difference and an east-west difference in combination with a heading angular difference. These are graphically represented as the target linear thrust 130 and the target moment 132. The target linear thrust 130 is the net difference in the longitude and latitude positions represented by the target position and current position. The heading difference is the angular difference between angles A2 and A1 in FIG. 13.

This information, which is described in terms of global measurements and which are in reference to stationary global references, are provided to an error calculator 148 which resolves those values into forward-reverse, left-right, and heading changes in reference to clockwise and counterclockwise movement of the marine vessel 10. These errors are provided to a PID controller 150.

As is generally known to those skilled in the art, a PID controller uses proportional, integral, and derivative techniques to maintain a measured variable at a preselected set point. Examples of this type of controller are used in cruise control systems for automobiles and temperature control systems of house thermostats. In the proportional band of the controller, the controller output is proportional to the error between the desired magnitude and the measured magnitude. The integral portion of the controller provides a controller output that is proportional to the amount of time that an error, or difference, is present. Otherwise, an offset (i.e. a deviation from set point) can cause the controller to become unstable under certain conditions. The integral portion of the controller reduces the offset. The derivative portion of the controller provides an output that is proportional to the rate of change of the measurement or of the difference between the desired magnitude and the actual current magnitude.

Each of the portions, or control strategies, of the PID controller typically uses an individual gain factor so that the controller can be appropriately tuned for each particular application. It should be understood that specific types of PID controllers and specific gains for the proportional, integral, and derivative portions of the controller are not limiting.

With continued reference to FIG. 14, the error correction information provided by the PID controller 150 is used by the maneuvering algorithm 154 which is described above in greater detail. The maneuvering algorithm receives information describing the required corrective vectors, both the linear corrective vector and the moment corrective vector, necessary to reduce the error or difference between the current global position and heading and the target global position and heading.

As described above, the method for positioning a marine vessel 10, in accordance with a particularly preferred embodiment, comprises the steps of obtaining a measured position of the marine vessel 10. As described in conjunction with FIGS. 11-14, the measured position of the marine vessel is obtained through the use of the GPS devices 101 and 102, in cooperation with the inertial measurement unit (IMU) 106. The present embodiment further comprises the step of selecting a desired position of the marine vessel. This is done by a target selector 140 that responds to being placed in an enabling mode by an operator input device 120 in combination with a joystick 50 being placed in an inactive mode. When those situations occur, the target selector 140 saves the most recent magnitudes of the global position and heading provided by the IMU 106 as the target global position and target heading. A preferred embodiment further comprises the step of determining a current position of the marine vessel 10. This is done, in conjunction with the error calculator 144, by saving the most recent magnitude received from the IMU 106. The present embodiment further comprises the step of calculating a difference between the desired and current positions of the marine vessel. These differences, in a particularly preferred embodiment, are represented by the differences, in longitude and latitude positions, of the center of gravity 12 of the marine vessel between the desired and current positions. The preferred embodiment then determines the required movements to reduce the magnitude of that difference. This is done through the use of a PID controller 150. Once these movements are determined, the first and second marine propulsion devices are used to maneuver the marine vessel 10 in such a way that it achieves the required movements to reduce the difference between the desired position and the current position. The steps used efficiently and accurately maneuver the marine vessel 10 in response to these requirements are described above in detail in conjunction with FIGS. 1-10.

With reference to FIGS. 11 and 14, it should be understood that an alternative embodiment could replace the two GPS devices, 101 and 102, with a single GPS device that provides information concerning the global position, in terms of longitude and latitude, of the marine vessel 10. This single GPS device could be used in combination with an electronic compass which provides heading information, as represented by arrow 110, pertaining to the marine vessel 10. In other words, it is not necessary in all embodiments to utilize two GPS devices to provide both global position and heading information. In the particularly preferred embodiment described above, the two GPS devices work in cooperation with the IMU 106 to provide additional information beyond the global position. In addition to providing information relating to the heading of the marine vessel 10, as represented by arrow 110, the two GPS devices in association with the IMU 106 provide additional information as described above in greater detail. Alternative embodiments, which utilize a single GPS device in cooperation with an electronic compass, are also within the scope of the present disclosure. In fact, any combination of devices that is able to provide information identifying the global position and heading of the marine vessel 10 can be used in conjunction with the present embodiment.

With continued reference to FIGS. 11 and 14, it should also be understood that the IMU 106 could be used as a separate unit which provides data into another device, or vice versa, for the purpose of providing information relating to position and heading correction information. It should therefore be clearly understood that alternative configurations of the IMU 106 and microprocessor 116 could be used in conjunction with the present embodiments as long as the system is able to provide information relating to the appropriate corrections necessary to cause the marine vessel 10 to move toward a desired position in such a way that its center of gravity 12 remains at its desired position and the heading, as represented by arrow 110, is maintained at the desired heading position of the marine vessel. Many different embodiments can be incorporated in the marine vessel 10 for the purposes of providing the information relating to the global position, the heading of marine vessel 10, and the appropriate thrust vectors necessary to achieve an effective correction of the position and heading of the marine vessel so that it remains at the desired position.

Although the description regarding FIGS. 1-14 relates to a vessel 10 that is maneuverable by first and second marine propulsion devices, it should be recognized that the present disclosure is not limited to such an arrangement. For example, the concepts discussed in this disclosure are operable in conjunction with a system or vessel that is maneuverable in station keeping modes by more than two marine propulsion devices, which can include any type of device for providing a propulsive power, such as an inboard arrangement, outboard arrangement, pod arrangement, etc. Further, the concepts disclosed herein are not limited to arrangements that include a pair of global positioning devices and a single IMU unit. Rather, the concepts disclosed herein can be accomplished with more or less such units according to known vessel positioning control structures.

The present inventors have recognized that the station keeping functions provided in the prior art can often place the marine vessel in a position where it is both pitching and rolling over waves. Combined pitching and rolling action can often cause passenger discomfort, which is undesirable. That is, it has been found that many passengers will experience less discomfort if the vessel is in a position where it is pitching but not rolling or rolling but not pitching. FIGS. 15-19 depict various examples of waves engaging a marine vessel 210 and the effect that these waves have on pitch and roll of the vessel 210. For discussion purposes, the dimensions of the waves in each of these examples are the same, with only the direction of the waves in relation to the vessel 210 varying by example.

Figure 15A:
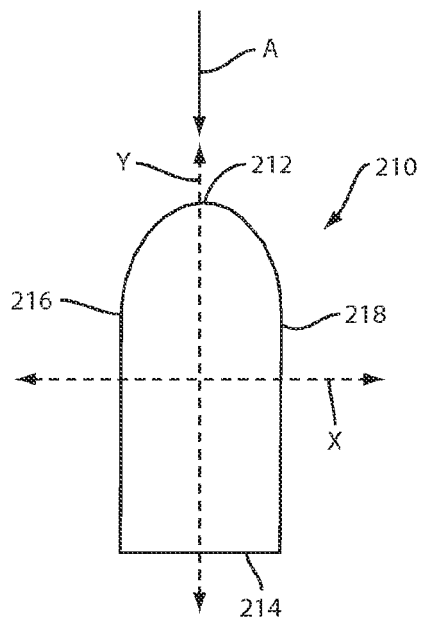
FIG. 15a schematically shows waves traveling towards the bow of a marine vessel.

FIG. 15a is a highly schematic depiction of a marine vessel 210 having a bow 212, a stern 214, a port side 216 and a starboard side 218. A longitudinal axis Y is depicted in dashed line format extending from the stern 214 to the bow 212. A lateral axis X is also depicted in dashed line format extending from the port side 216 to the starboard side 218. The longitudinal axis Y and lateral axis X are oriented at 90 degrees from each other. An arrow A represents a direction in which waves are heading with respect to the vessel.

Figure 15B:
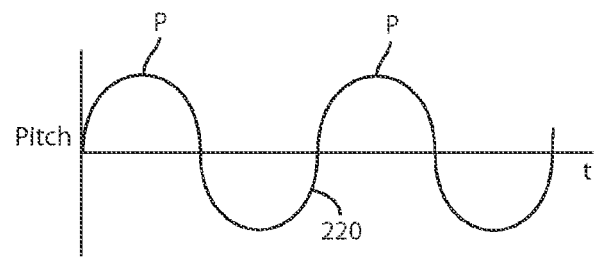
FIG. 15b is a graph showing pitch of the vessel shown in FIG. 15a over time.

In FIG. 15a, the arrow A is parallel to the longitudinal axis Y extending from the bow 212 to the stern 214 and thus the waves are headed parallel to the longitudinal axis Y towards the bow 212 of the vessel 210, thus causing the vessel 210 to pitch up and down with the waves an amount determined by the particular dimensions of the waves. The term "pitch" in this disclosure means the rise and fall of the bow 212 and stern 214 of the vessel 210, which is caused by waves engaging the vessel 210, causing rotation of the vessel 210 about the X-axis. FIG. 15b graphically depicts a curve 220 representing the pitch of the vessel 210 over time (t) according to the example shown in FIG. 15a. In this example, the pitch of the vessel 210 has a peak value or peak pitch P represented by the peak of the curve 220.

Figure 15C:
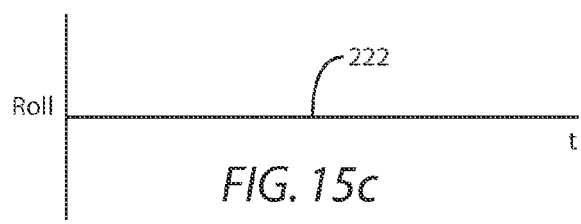
FIG. 15c is a graph showing roll of the vessel shown in FIG. 15a over time.

In FIG. 15a, the waves impact the port side 216 or starboard side 218 equally, and thus the vessel 210 is not subject to any roll. The term "roll" in this disclosure means the rise and fall of the port side 216 and starboard side 218 of the vessel 210, which is caused by waves engaging the vessel 210, causing rotation of the vessel 210 about the Y-axis. FIG. 15c graphically depicts a line 222 representing the roll of the vessel over time (t) according to the example shown in FIG. 15a. In this example, the line 222 is flat and has a value of zero because the vessel 210 has zero roll.

Figure 16A:
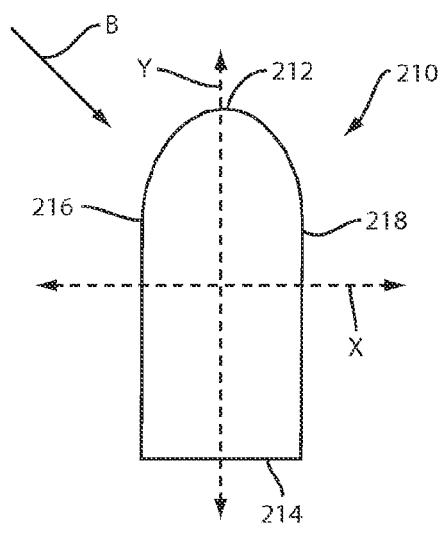
FIG. 16a schematically shows waves traveling at an angle towards the bow of a marine vessel.
Figure 16B:
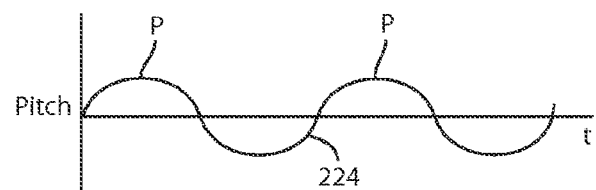
FIG. 16b is a graph showing pitch of the vessel shown in FIG. 16a over time.

FIG. 16a depicts the vessel 210 being engaged by waves in a direction of an arrow B, which is oriented at about a 45 degree angle with respect to each of the longitudinal axis Y and the lateral axis X, thus causing the vessel 210 to both pitch and roll with the waves by amounts determined by the dimensions of the waves. FIG. 16b graphically depicts a curve 224 representing the pitch of the vessel 210 over time and FIG. 16c graphically depicts a curve 226 representing the roll of the vessel 210 over time. Both waves 224 and 226 have peak values (P and R, respectively) representative of the peak pitch and peak roll, respectively. In this example, the vessel 210 has a peak pitch P that is less than the peak pitch P in the example of FIG. 15a. This is because the direction of the waves is not parallel to the longitudinal axis Y, but rather is at an angle to it. Also, the vessel 210 has a peak roll R that is larger than the example of FIG. 15a because the direction of the waves is not oriented at a right angle to the lateral axis X, but rather is at an angle smaller than a right angle to it.

Figure 17A:
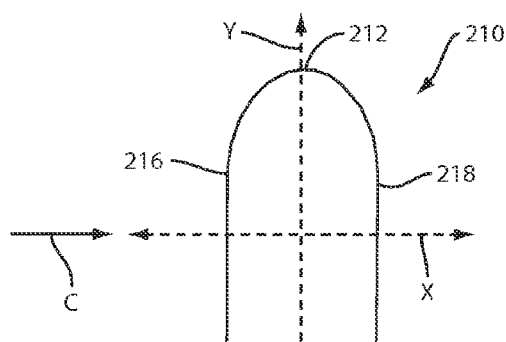
FIG. 17a schematically shows waves traveling towards the port side of a marine vessel.
Figure 17B:
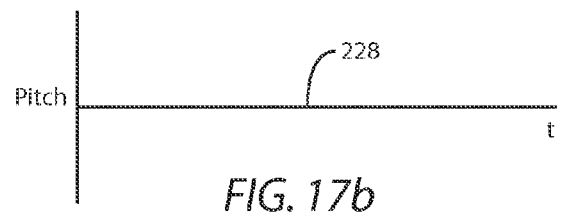
FIG. 17b is a graph showing pitch of the vessel shown in FIG. 17a over time.
Figure 17C:
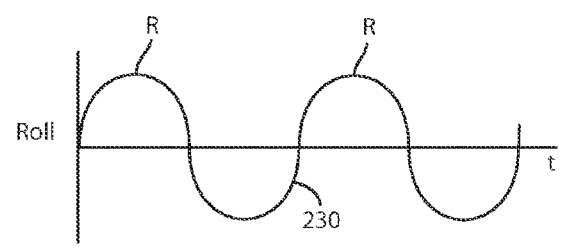
FIG. 17c is a graph showing roll of the vessel shown in FIG. 17a over time.

FIG. 17a depicts the vessel 210 being engaged by waves in a direction of an arrow C, which is oriented parallel to the transverse axis X, thus causing the vessel to roll with the waves according to the particular dimensions of the waves. The waves are not traveling in a direction that directly impacts the bow 212 or stern 214, and thus the vessel 210 is not subject to any pitch. FIG. 17b graphically depicts a flat line 228 representing zero pitch of the vessel 210 over time. FIG. 17c graphically depicts a curve 230 representing the roll of the vessel 21 over time. The vessel 210 has a peak roll R that is located at the peak of curve 230.

Figure 16C:
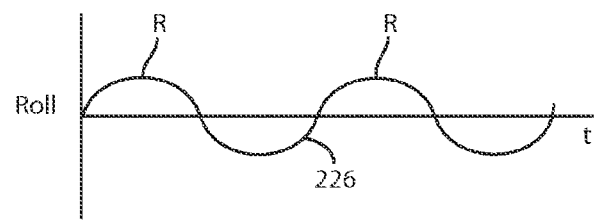
FIG. 16c is a graph showing roll of the vessel shown in FIG. 16a over time.
Figure 18A:
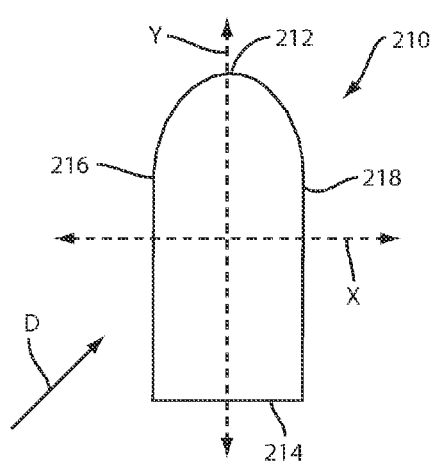
FIG. 18a schematically shows waves traveling at an angle towards the stern of a marine vessel.
Figure 18B:
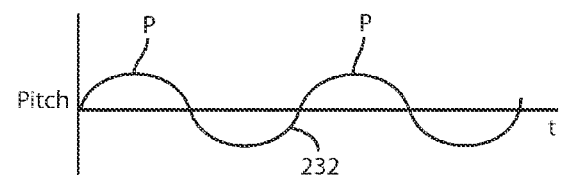
FIG. 18b is a graph showing pitch of the vessel shown in FIG. 18a over time.
Figure 18C:
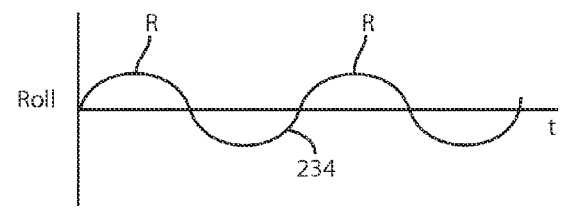
FIG. 18c is a graph showing roll of the vessel shown in FIG. 18a over time.
Figure 19A:
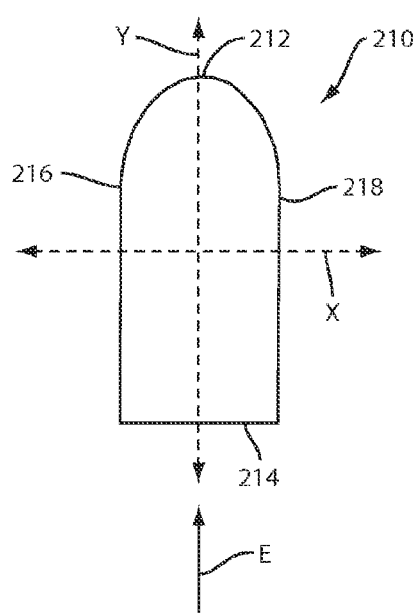
FIG. 19a schematically shows waves traveling towards the stem of a marine vessel.
Figure 19B:
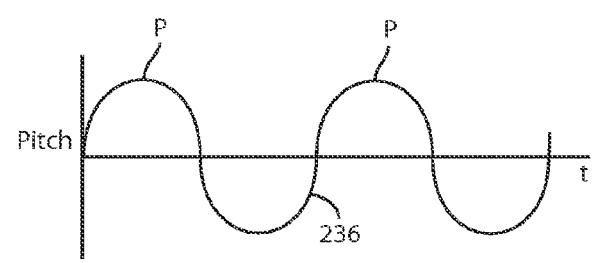
FIG. 19b is a graph showing pitch of the vessel shown in FIG. 19a over time.
Figure 19C:
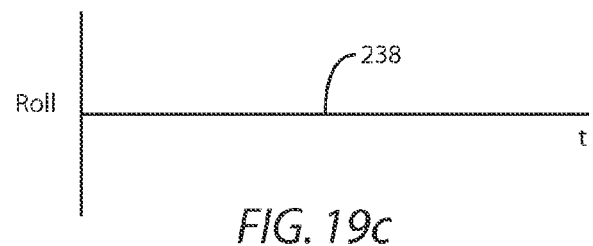
FIG. 19c is a graph showing roll of the vessel shown in FIG. 19a over time.

FIGS. 18a-18c are comparable to FIGS. 16a-16c with the difference being that the direction of waves represented by the arrow D is oriented towards the stern 214 and port side 216 of the vessel 210. FIGS. 19a-19c are comparable to FIGS. 15a-15c except the direction of waves represented by the arrow E is oriented towards the stern 214 rather than the bow 212. Together, FIGS. 18a-18c and 19a-10c demonstrate that pitch and roll will vary depending upon the angular direction of the waves with respect to the longitudinal and lateral axes Y, X in a similar manner for each quadrant defined by the axes. That is, the directions of waves shown by arrows B and D have similar effects on the pitch and roll of the marine vessel. This same correlation holds true for waves that are directed towards the vessel 210 on the starboard side 218 (not shown). The closer the waves are in angular direction to the longitudinal axis Y, the greater the pitch and the smaller the roll. The closer the waves are in angular direction to the lateral axis X, the greater the roll and the smaller the pitch.

Figure 20:
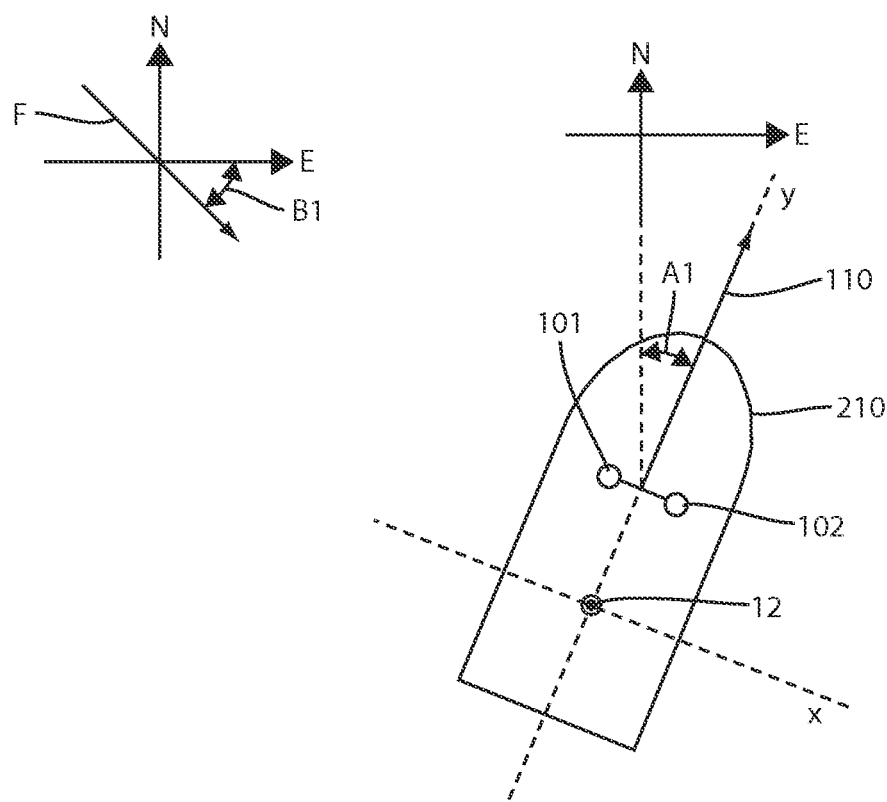
FIG. 20 is a schematic representation of a marine vessel at a particular global position and with a particular heading which are exemplary.

FIG. 20 depicts a marine vessel 210 that is being operated according to station keeping functionality, as described above regarding FIGS. 1-14. Similar to the discussion regarding FIG. 12, the marine vessel 210 is at an exemplary global position 12, measured as longitude and latitude, and an exemplary heading represented by angle A1 between the heading arrow of the marine vessel 210 and a due north vector. As described above, GPS devices, 101 and 102, and the IMU (e.g. 106 described above) determine the information relating to the position of the vessel 210. For description purposes, the position 12 will be the position of the center of gravity of the marine vessel and a heading vector 110 which extends through the center of gravity. However, it should be understood that alternative locations on the marine vessel 210 can be used for these purposes. The IMU 106, described above in conjunction with FIG. 11, provides a means by which this location on the marine vessel 10 can be selected.

FIG. 20 also depicts a direction arrow F representing the direction in which waves are traveling and engaging the marine vessel 210. The waves are oriented at an angle B1 with respect to the due east vector. As will be understood in conjunction with the description of FIGS. 15-19 above, the waves cause the vessel 210 to undergo both pitch and roll motion based upon the angular direction of the waves with respect to the longitudinal Y and lateral X axes of the vessel and with respect to the dimensions of the waves and of the vessel.

Therefore, as the station keeping functions described above are carried out according to the prior art examples, the vessel 210 is maintained in a position that encourages both continual pitching and continual rolling of the vessel 210. This can be undesirably uncomfortable for the passengers on the vessel 210.

According to the present disclosure, systems for orienting a marine vessel 210 are provided that minimize the undesirable effects of combined pitching and rolling of a marine vessel 210 in station keeping modes. The marine vessel 210 is provided with a plurality of marine propulsion devices, such as for example the devices 27, 28 described above with reference to FIGS. 1-14. The marine vessel 210 is also provided with a control device, such as for example microprocessor 116, having a memory and a programmable circuit, which is programmed to control operation of the plurality of marine propulsion devices, such as for example 27, 28, to maintain orientation of the vessel 210 in the selected global position 12. The control device 116 is configured to receive at least one of an existing pitch and existing roll of the marine vessel 210 in the selected global position 12. The pitch and roll values can both be provided by onboard monitoring equipment that is known in the art, such as the IMU 106 described above. The pitch and/or roll values can include a maximum pitch P value and/or maximum roll R value, as discussed above regarding FIGS. 15-19. In this example, the control device 116 is further programmed to control operation of the plurality of marine propulsion units 27, 28 to change the actual heading 110 of the marine vessel 210 to minimize at least one of actual pitch and actual roll of the marine vessel 210, while maintaining the marine vessel in the selected global position 12.

Figure 21:
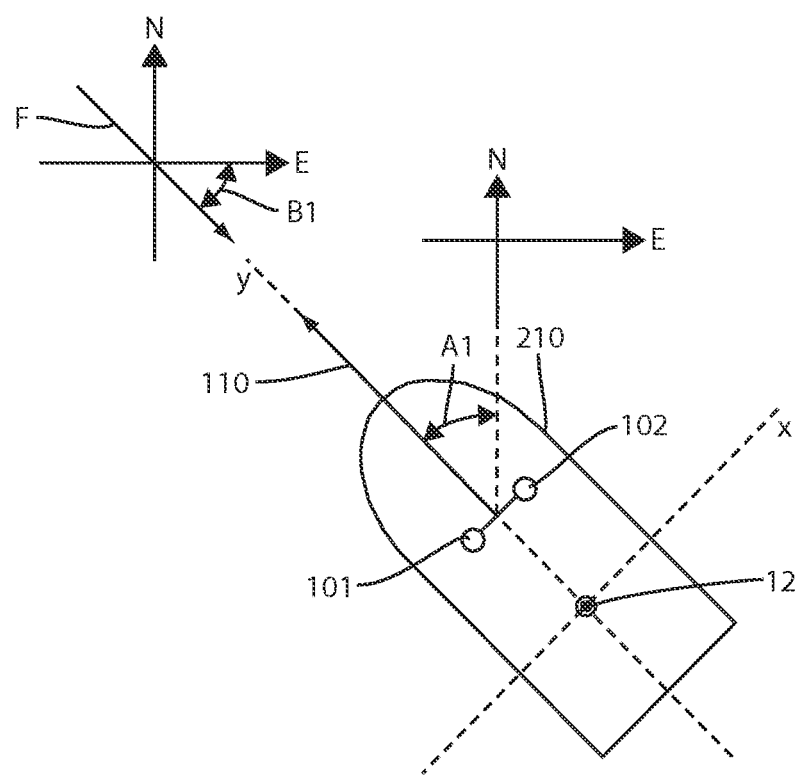
FIG. 21 is a schematic representation of a marine vessel at a particular global position and with an adjusted heading to minimize roll.

FIG. 21 depicts the marine vessel 210 after the above-described control function has been carried out to minimize roll. The control device 116 controls operation of the marine propulsion devices 27, 28 to create a moment 132 on the vessel 210, in accordance with the vectoring discussed above regarding FIGS. 1-14 to rotate the vessel 210 into a position wherein its actual heading 110 is aligned with the direction F in which waves are acting on the vessel 210. This places the vessel 210 in the orientation described above regarding FIGS. 15a-15c wherein the direction of incoming waves are aligned with the longitudinal axis Y. It will be recognized that similar effect on the pitch and roll of the vessel 210 will be achieved if the vessel 210 were to be rotated 180 degrees about the position 12 so that the stern 214 of the vessel 210 was pointed towards the direction F of the incoming waves. Roll would be minimized as shown in FIG. 15c and pitch would be maximized, as shown in FIG. 15b.

Figure 22:
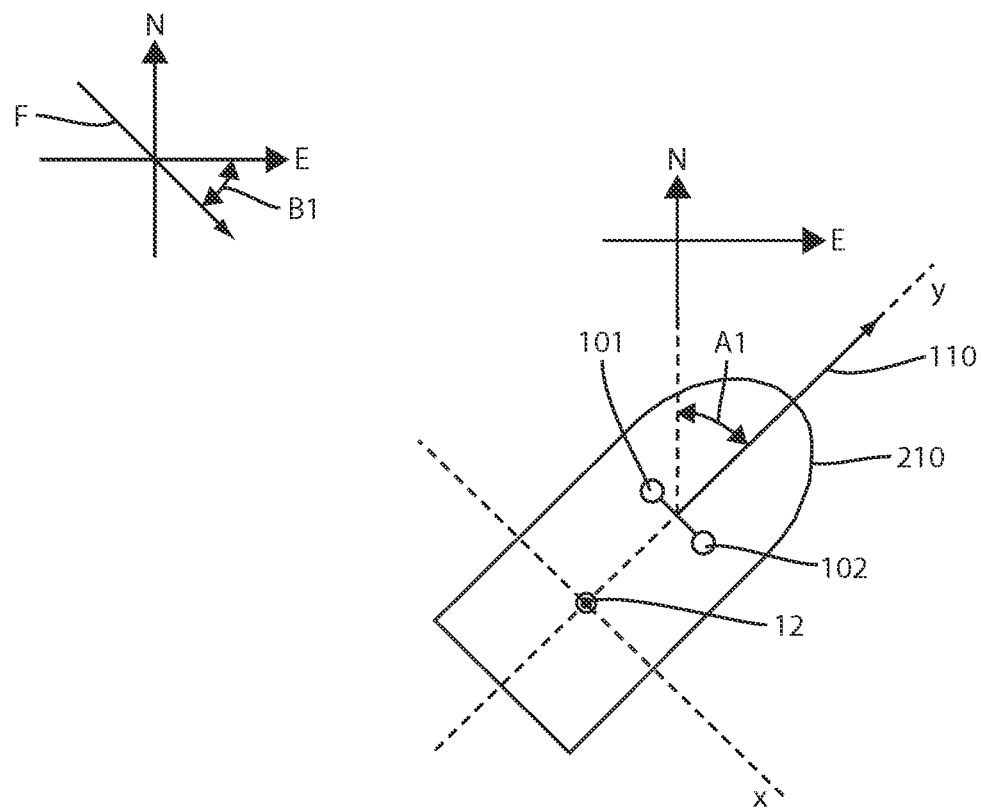
FIG. 22 is a schematic representation of a marine vessel at a particular global position and with an adjusted heading to minimize pitch.

FIG. 22 depicts the marine vessel 210 after the above-described control function has been carried out to minimize pitch. The control device 116 controls operation of the marine propulsion devices 27-28 to create a moment 132 (see FIG. 13) on the vessel 210, in accordance with the vectoring discussed above regarding FIGS. 1-14 to rotate the vessel 210 into a position wherein the lateral axis X is aligned with the direction F in which the waves are acting on the vessel 210. This places the vessel 210 in the orientation described above regarding FIGS. 17a-17c wherein the direction of incoming waves are aligned with the lateral axis X. It will be recognized that similar effect on the pitch and roll of the vessel 210 will be achieved if the vessel 210 is rotated 180 degrees about the position 12 so that the starboard side 218 of the vessel 210 faces the direction F of waves. Pitch would be minimized, as shown in FIG. 17c and roll would be maximized, as shown in FIG. 17b.

In these examples, the user input device(s) 50, 120 can include a button or other functional interface that allows the vessel operator to select between at least two different modes of control device operation, including a "Pitch Minimization Mode" wherein the control device 116 controls operation of the plurality of marine propulsion units 27, 28 to minimize pitch and a "Roll Minimization Mode" wherein the control device 116 controls operation of the plurality of marine propulsion units 27, 28 to minimize roll. Alternately, the selected mode can be pre-programmed in microprocessor 116.

Figure 23:
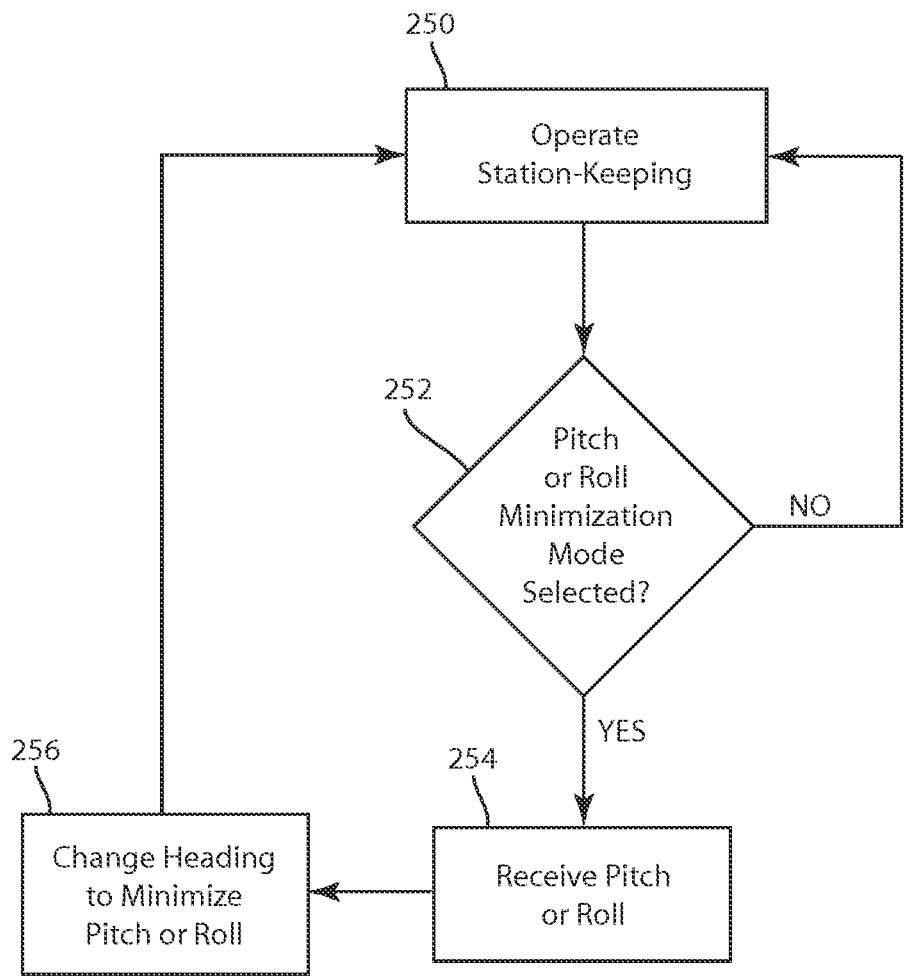
FIG. 23 is a flow chart showing exemplary steps in a method according to the present disclosure.

FIG. 23 depicts exemplary steps in a method for orienting a marine vessel 210. At step 250, at least one station keeping mode is operated in accordance with the embodiments discussed above regarding FIGS. 1-14 to maintain a marine vessel at a stationary, selected position. At step 252, an operator selects between a Pitch Minimization Mode and a Roll Minimization Mode or alternately the mode can be pre-programmed and automatically carried out by a controller such as microprocessor 116. If neither of these modes is selected at step 252, step 250 is continued. If either Pitch Minimization Mode or Roll Minimization Mode is selected, the control system for the marine vessel, at step 254, receives a value of at least one of pitch and/or roll of the marine vessel in the global position. The value for pitch and/or roll can be provided, for example, by an inertial measurement unit, as is described herein above. At step 256, the control system is operated to change the heading of the marine vessel to minimize at least one of the pitch and the roll while maintaining the marine vessel in the preselected global position.

Figure 24:
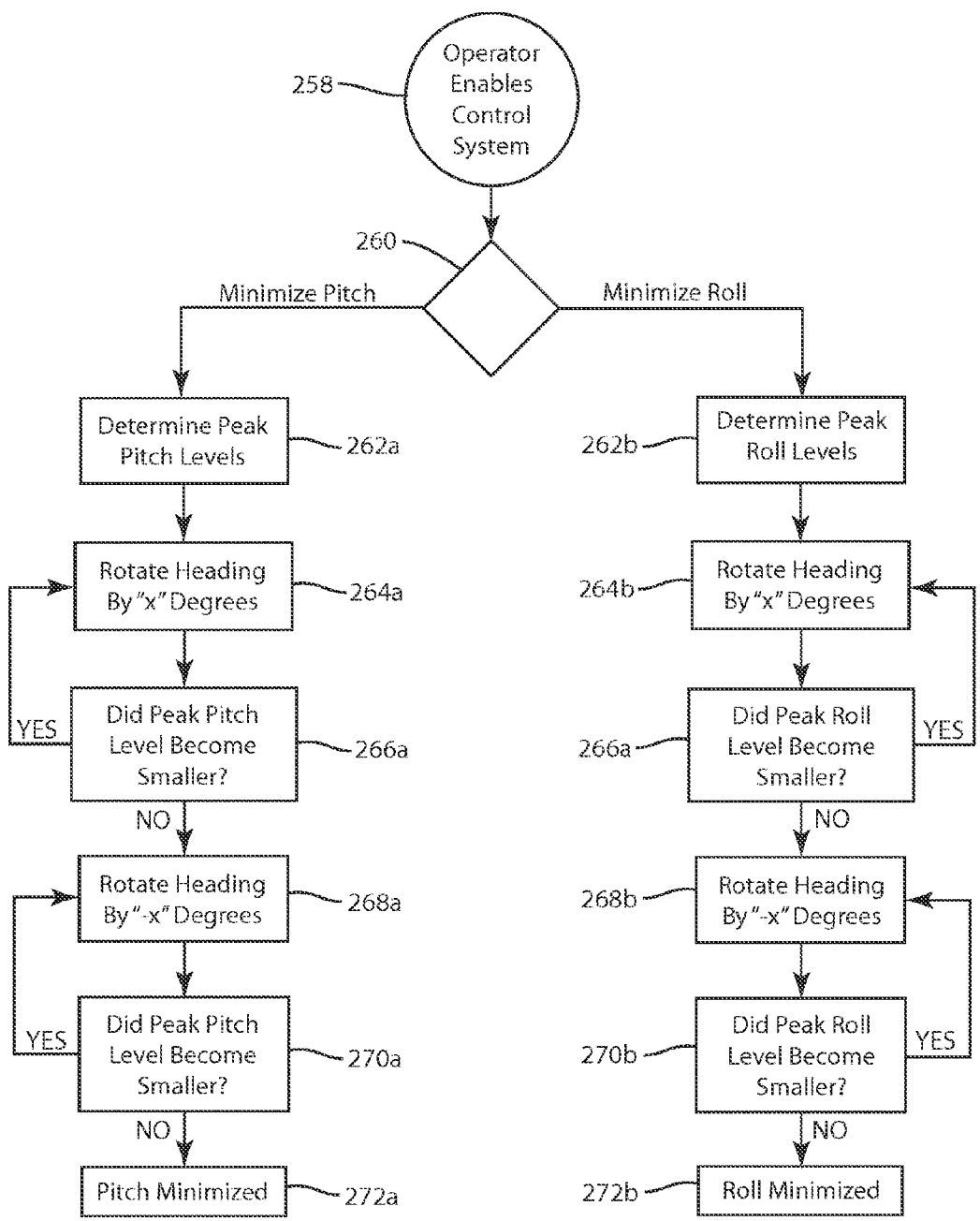
FIG. 24 is a flow chart showing further exemplary steps in a method according to the present disclosure.

A preferred embodiment for steps 250 through 256 is described with reference to FIG. 24. At step 258, the vessel operator enables the control system. This step preferably includes enablement of at least one of the station keeping modes described hereinabove regarding FIGS. 1-14. At step 260, the operator or the control system selects between the "Pitch Minimization Mode" and the "Roll Minimization Mode", as described hereinabove. If Pitch Minimization Mode is selected, the process continues according to steps 262a-272a. If Roll Minimization Mode is selected, the process continues according to steps 262b-272b. For Roll Minimization Mode, at step 262a, the current peak pitch P is determined. This can be measured and provided to the control system by known marine technology, such as an inertial measurement unit. Thereafter, at step 264a, the control system operates the marine propulsion units to create an effective moment arm on the marine vessel and thereby changes the heading of the marine vessel by predetermined positive amount or number of positive "X" degrees. At step 266a, the peak pitch P is again determined and compared to the peak pitch P measured at step 262a. If the peak pitch P has decreased, the control system operates the marine propulsion units to again rotate the marine vessel by a predetermined positive amount or number of positive "X" degrees. This continues in perpetuity as long as the peak pitch P continues to decrease. If, at step 266a, the peak pitch has increased, the control system operates to change the actual heading of the marine vessel at step 268a by a predetermined negative amount or number of negative "–X" degrees. Thereafter, at step 270a, the peak pitch P is again measured and compared to the peak pitch measured at step 266a. If the peak pitch level has been found to have decreased, step 268a is repeated. If the peak pitch P measured at step 270a has been found to have increased, the pitch has been found to have been minimized at step 272a and the vessel is determined to be positioned according to the example of FIG. 15a.

If, at step 260, the operator selects Roll Minimization Mode, steps 262b-272b are undertaken. Steps 262b-272b mirror steps 262a-272a, with the difference being that the marine vessel is rotated into a position so as to minimize roll, such as the position shown in FIG. 16a.

What is claimed is:

1. A system for orienting a marine vessel, comprising:
a plurality of marine propulsion devices configured to orient a marine vessel;
a control device having a memory and a programmable circuit, the control device configured to control operation of the plurality of marine propulsion devices to maintain orientation of the marine vessel in a selected global position and heading;
wherein the control device is configured to receive pitch and roll of the marine vessel in the global position;
wherein the control device is configured to control operation of the plurality of marine propulsion units to change the heading of the marine vessel to minimize one of the pitch and the roll while maintaining the marine vessel in the selected global position; and
a user input device configured to allow a user to select between at least two different modes of control device operation, including a Pitch Minimization Mode wherein the control device controls operation of the plurality of marine propulsion units to minimize the pitch and a Roll Minimization Mode wherein the control device controls operation of the plurality of marine propulsion units to minimize the roll.

2. A system according to claim 1, comprising an inertial measurement unit measuring and providing the at least one of the pitch and the roll to the control device.

3. A system according to claim 2, wherein the user input device comprises a joystick.

4. A system according to claim 1, wherein the marine vessel extends along a longitudinal axis from a bow to a stern and wherein the marine vessel extends along a lateral axis from a ports side to a starboard side, the longitudinal axis being perpendicular to the lateral axis, and wherein the control device is configured to control operation of the plurality of marine propulsion units to reduce the roll by creating an effective moment arm on the marine vessel that causes the marine vessel to rotate until the longitudinal axis is aligned with a direction in which an external wave force is acting on the marine vessel.

5. A system according to claim 1, wherein the marine vessel extends along a longitudinal axis from a bow to a stern and wherein the marine vessel extends along a lateral axis from a ports side to a starboard side, the longitudinal axis being perpendicular to the lateral axis, and wherein the control device is configured to control operation of the plurality of marine propulsion units to reduce the pitch by creating an effective moment arm on the marine vessel that causes the marine vessel to rotate until the lateral axis is aligned with a direction in which an external wave force is acting on the marine vessel.

6. A system according to claim 1, wherein the control device is configured to minimize the pitch and the roll by performing a gradient search method.

7. A system according to claim 6, wherein the gradient search method comprises:
a. measuring a first peak pitch;
b. changing the heading of the marine vessel by a predetermined positive amount;
c. measuring a second peak pitch; and
d. repeating steps (a) through (c) if the first peak pitch is greater than the second peak pitch.

8. A system according to claim 7, wherein the gradient search method comprises:

e. changing the heading of the marine vessel by a predetermined negative amount if the first peak pitch is less than the second peak pitch.

9. A system according to claim 6, wherein the gradient search method comprises:
a. measuring a first peak roll;
b. changing the heading of the marine vessel by a predetermined positive amount;
c. measuring a second peak roll; and
d. repeating steps (a) through (c) if the first peak roll is greater than the second peak roll.

10. A system according to claim 9, wherein the gradient search method comprises:
e. changing the heading of the marine vessel by a predetermined negative amount if the first peak roll is less than the second peak roll.

11. A system according to claim 1, wherein the control device is programmed to actively control operation of the plurality of marine propulsion units to continuously minimize the one of the pitch and the roll.

12. A system according to claim 1, wherein the control device is programmed to control operation of the plurality of marine propulsion units to create a moment arm that causes rotation of the marine vessel about its center of gravity to minimize the at least one of the pitch and the roll.

13. A method for orienting a marine vessel, comprising:
operating a control system for maintaining a global position and heading of the marine vessel;
determining pitch and roll of the marine vessel in the global position;
operating the control system to change the heading of the marine vessel to minimize one of the pitch and the roll while maintaining the marine vessel in the global position; and
selecting between at least two different modes of control system operation including a Pitch Minimization Mode wherein the control system controls operation of the plurality of marine propulsion units to minimize pitch and a Roll Minimization Mode wherein the control system controls operation of the plurality of marine propulsion units to minimize roll.

14. A method according to claim 13, wherein the marine vessel extends along a longitudinal axis from a bow to a stern and wherein the marine vessel extends along a lateral axis from a port side to a starboard side, the longitudinal axis being perpendicular to the lateral axis, and comprising operating the control system to reduce roll by creating an effective moment arm on the marine vessel that causes the marine vessel to rotate until the longitudinal axis is aligned with a direction in which an external wave force is acting on the marine vessel.

15. A method according to claim 13, wherein the marine vessel extends along a longitudinal axis from a bow to a stern and wherein the marine vessel extends along a lateral axis from a ports side to a starboard side, the longitudinal axis being perpendicular to the lateral axis, and comprising operating the control system to reduce pitch by creating an effective moment arm on the marine vessel that causes the marine vessel to rotate until the lateral axis is aligned with a direction in which an external wave force is acting on the marine vessel.

16. A method according to claim 13, comprising minimizing one of the pitch and the roll by performing a gradient search method.

17. A method according to claim 12 wherein the gradient search method comprises:
a. measuring a first peak pitch;
b. changing the heading of the marine vessel by a predetermined positive amount;

c. measuring a second peak pitch; and
d. repeating steps (a) through (c) if the first peak pitch is greater than the second peak pitch.

18. A method according to claim 17 wherein the gradient search method further comprises:
e. changing the heading of the marine vessel by a predetermined negative amount if the first peak pitch is less than the second peak pitch.

19. A method according to claim 18 wherein the gradient search method comprises:
a. measuring a first peak roll;
b. changing the heading of the marine vessel by a predetermined positive amount;
c. measuring a second peak roll; and
d. repeating steps (a) through (c) if the first peak roll is greater than the second peak roll.

20. A method according to claim 19 wherein the gradient search method further comprises:
e. changing the heading of the marine vessel by a predetermined negative amount if the first peak roll is less than the second peak roll.

21. A method according to claim 13 comprising operating the control system to change the heading of the marine vessel by controlling operation of the plurality of marine propulsion devices to create a moment arm that causes rotation of the marine vessel about a center of gravity of the marine vessel.

* * * * *